US010424186B2

(12) United States Patent
Bhattacharya et al.

(10) Patent No.: US 10,424,186 B2
(45) Date of Patent: *Sep. 24, 2019

(54) SYSTEM AND METHOD FOR CUSTOMIZED MESSAGE PLAYBACK

(71) Applicant: SONY CORPORATION, Tokyo (JP)

(72) Inventors: Piyush Bhattacharya, Bangalore (IN); Jaison Joseph, Bangalore (IN); Pramod Chintalapoodi, San Diego, CA (US)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/856,452

(22) Filed: Dec. 28, 2017

(65) Prior Publication Data
US 2019/0206228 A1 Jul. 4, 2019

(51) Int. Cl.
G08B 1/08 (2006.01)
G08B 25/01 (2006.01)
G06K 9/00 (2006.01)
G10L 25/48 (2013.01)
G08B 13/196 (2006.01)
G07C 9/00 (2006.01)
H04N 7/18 (2006.01)

(52) U.S. Cl.
CPC ....... G08B 25/016 (2013.01); G06K 9/00268 (2013.01); G06K 9/00335 (2013.01); G06K 9/00771 (2013.01); G07C 9/00071 (2013.01); G08B 13/19656 (2013.01); G10L 25/48 (2013.01); H04N 7/18 (2013.01)

(58) Field of Classification Search
None
See application file for complete search history.

(56) References Cited

U.S. PATENT DOCUMENTS 9,160,987 B1 10/2015 Kasmir et al.
9,197,867 B1* 11/2015 Scalisi ................ H04N 7/188
9,953,514 B2* 4/2018 Fadell ................ G08B 27/003

FOREIGN PATENT DOCUMENTS

CN 104038742 A 9/2014

OTHER PUBLICATIONS

"Chui Doorbell", 214 Technologies, ABI Research, Hot Tech Innovators, Feb. 19, 2015, 236 pages.
Non-Final Office Action for U.S. Appl. No. 15/241,671, dated May 10, 2017, 17 pages.
Notice of Allowance for U.S. Appl. No. 15/241,671, dated Oct. 6, 2017, 08 pages.

* cited by examiner

Primary Examiner — Adolf Dsouza
(74) Attorney, Agent, or Firm — Chip Law Group

(57) ABSTRACT

A system for customized message playback includes a first electronic device, which is configured to detect one or more physiological and/or behavioral characteristics of a first user. One or more attributes associated with the detected one or more physiological and/or behavioral characteristics of the first user are determined. One or more media items are retrieved from a plurality of media items in accordance with the determined one or more attributes. The retrieved one or more media items are played back at the first electronic device for the first user and/or a pre-registered second electronic device for a second user.

19 Claims, 9 Drawing Sheets

SYSTEM AND METHOD FOR CUSTOMIZED MESSAGE PLAYBACK

CROSS-REFERENCE TO RELATED APPLICATIONS/INCORPORATION BY REFERENCE

The present application is a continuation application of U.S. patent application Ser. No. 15/241,671, filed Aug. 19, 2016, the entire content of which is incorporated herein by reference.

FIELD

Various embodiments of the disclosure relate to data communication and media processing. More specifically, various embodiments of the disclosure relate to a system and method for customized message playback.

BACKGROUND

Various electronic devices, such as security or surveillance systems, may be used in premises, such as a household, an office, or an industrial establishment, to secure entrances, occupants, and/or other valuable goods in the premises. The electronic devices may also serve to interface between visitors and occupants of the premises. For instance, when a visitor arrives at household premises, the visitor may press a doorbell button at an entrance of the premises, which may output a bell or tune from the doorbell to an occupant of the household premises. When the bell or tune is played, the occupant may become aware of the arrival of a visitor at the household premises. In certain scenarios, the doorbell may be integrated with the security or surveillance system of the premises. For example, a camera (such as a CCTV camera) associated with a surveillance system may capture images of the visitor. The captured images of the visitor may be displayed to the occupant of the premises via an electronic device situated inside the premises or associated with the occupant. However, such existing systems may not provide a user-centric experience customized to both the visitor and the occupant(s) of the premises. An advanced eco-system may be required to not only enhance security of the premises, but also provide a platform that may augment usability of a smart security system while providing an enhanced experience to the end-users.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for customized message playback substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
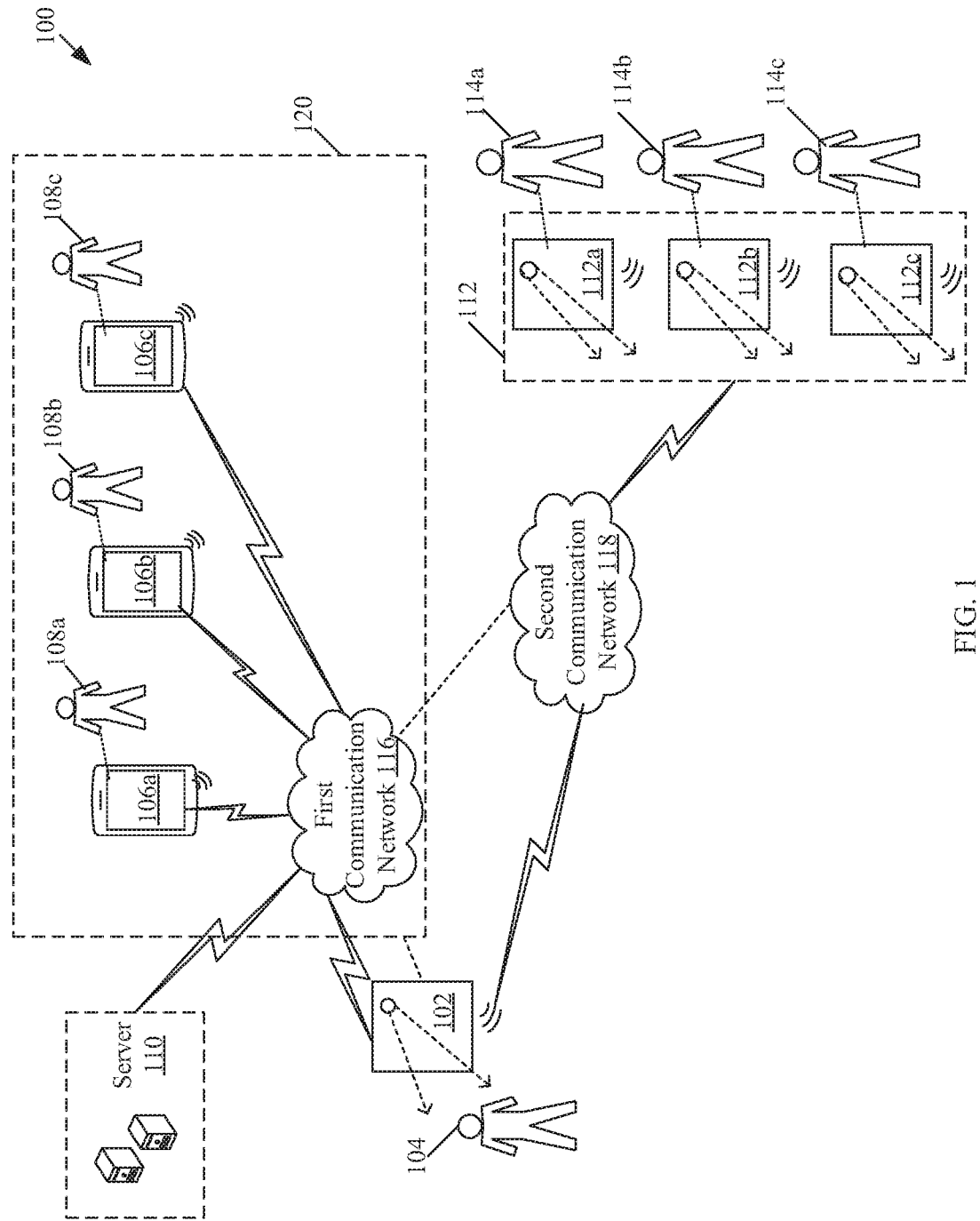
FIG. 1 illustrates an exemplary network environment for customized message playback, in accordance with an embodiment of the disclosure.

The following described implementations may be found in the disclosed method and system for customized message playback. Exemplary aspects of the disclosure may include a system that may include a first electronic device. The first electronic device may include one or more circuits configured to detect one or more physiological and/or behavioural characteristics of a first user. Thereafter, one or more attributes associated with the detected one or more physiological and/or behavioural characteristics of the first user may be determined. One or more media items may be retrieved from a plurality of media items in accordance with the determined one or more attributes. The one or more media items may be retrieved to be played back at the first electronic device for the first user and/or a pre-registered second electronic device for a second user.

In accordance with an embodiment, the first electronic device may correspond to a smart door bell, a security device, a smart door, an electronic security lock, and/or a surveillance system. The one or more physiological and/or behavioural characteristics of the first user may correspond to facial features, a voice sample, a clothing pattern, an emotional state, and/or a current activity of the first user. The one or more physiological and/or behavioural characteristics of the first user may further correspond to one or more objects held or worn by the first user.

In accordance with an embodiment, the one or more attributes of the first user may include an identity of the first user (user identification), a profession of the first user, an event associated with the first user, and/or a date-of-interest associated with the first user. The one or more attributes may further include a type of relationship of the first user who may be a visitor of a premises and the second user who may be an occupant of the premises. In addition, the one or more attributes may include a visit history of the first user, a pre-configured schedule of visit of the first user to the premises, and/or a purpose of previous visits of the first user to the premises or other premises.

In accordance with an embodiment, the first electronic device may be configured to capture one or more images or video of the first user by use of an image-capturing unit. The one or more images or video may be used for detection of the one or more physiological and/or behavioural characteristics of the first user. The first user may be identified based on detected one or more physiological and/or behavioural characteristics of the first user. In accordance with an embodiment, the first user may be identified based on recognition of a combination of facial features and a voice sample of the first user.

In accordance with an embodiment, different media items from the retrieved one or more media items may be played back at the first electronic device for the first user and the pre-registered second electronic device associated with the second user. In addition, the first electronic device may be configured to communicate an alert message to the pre-registered second electronic device for play back at the pre-registered second electronic device associated with the second user. The alert message may include a first media item from the retrieved one or more media items. The first electronic device may receive a second media item from the second electronic device in response to the communication of the alert message to the second electronic device. The received second media item may be played back at the first electronic device for the first user (such as the visitor).

In accordance with an embodiment, a current location information of the pre-registered second electronic device associated with the second user and/or one or more other pre-registered electronic devices associated with one or more other users (such as occupants of a premises) may be received. The current location information may be received from the pre-registered second electronic device and the one or more other pre-registered electronic devices. In accordance with an embodiment, the location information may be received from a cloud server, via a communication network.

In accordance with an embodiment, the retrieval of the one or more media items from the plurality of media items may be further based on the current location information. The current location information may indicate a presence or an absence of the pre-registered second electronic device and/or the one or more other pre-registered electronic devices associated with one or more other users of the premises, at a preset location of the premises.

In accordance with an embodiment, one or more other media items may be retrieved from the plurality of media items in accordance with the determined one or more attributes associated with the first user. The one or more other media items may be retrieved when the received current location information indicates that the pre-registered second electronic device is present at one of a plurality of preset locations of known users. One of the retrieved one or more other media items may be played back on a specific network device associated with the one of the plurality of preset locations. Such play back may be controlled by the first electronic device.

In accordance with an embodiment, a first set of network devices may be selected from a plurality of network devices to communicate a message including a media item from the retrieved one or more media items. The plurality of network devices may be installed at different locations. The selection of the first set of network devices may be based on the determined one or more attributes and the received current location information of the second electronic device. The first set of network devices may be associated with a first group of users known to the second user. The play back of the media item on the first set of network devices may be controlled based on pre-configured instructions. The pre-configured instructions may be pre-stored at the first electronic device, received from the second electronic device, or retrieved from a cloud server. In addition, a specific network device from the plurality of network devices may be selected to communicate a customized message. The customized message may include a pre-selected media item in accordance to a date-of-interest associated with a user of the selected specific network device.

In accordance with an embodiment, the first electronic device may be configured to determine whether to grant an access to the premises of the second user. The determination of whether to grant the access may be based on the determined one or more attributes and/or a result of a temporal analysis of the determined one or more attributes by use of a machine learning technique. Alternatively, in accordance with an embodiment, an authorization instruction may be received from the second electronic device to automatically unlock a door to grant an access to the premises of the second user.

FIG. 1 illustrates an exemplary network environment for customized message playback, in accordance with an embodiment of the disclosure. With reference to FIG. 1, there is shown an exemplary network environment 100. The exemplary network environment 100 may include a first electronic device 102 and a first user 104 who may visit a pre-specified location or premises 120 at which the first electronic device 102 is installed. There is further shown a second electronic device 106a and a second user 108a. The second user 108a may be an occupant of the premises 120 and may be associated with the second electronic device 106a.

The exemplary network environment 100 may further include one or more other electronic devices of other occupants of the premises 120, such as a third electronic device 106b and a fourth electronic device 106c. There is shown a third user 108b, who may be associated with the third electronic device 106b, and a fourth user 108c, who may be associated with the fourth electronic device 106c. There is further shown a server 110 and a plurality of network devices 112. The plurality of network devices 112 may include a first network device 112a, a second network device 112b, and a third network device 112c. Users, such as a first remote user 114a, a second remote user 114b and a third remote user 114c, may be associated with respective network devices from the plurality of network devices 112, as shown.

There is further shown a first communication network 116 and a second communication network 118. The first communication network 116 may connect the first electronic device 102 with other electronic devices in the premises 120, such as the second electronic device 106a, the third electronic device 106b and the fourth electronic device 106c, and the server 110. The second communication network 118 may connect the first electronic device 102 and the plurality of network devices 112.

The first electronic device 102 may be a smart door bell, a security device, a smart door, an electronic security lock, and/or a surveillance system. In accordance with an embodiment, the first electronic device 102 may be installed at (or associated) with the premises 120. The first electronic device 102 may include suitable logic, circuitry, and/or code to provide an audio-visual interface to the first user 104, recognize the first user 104, and play back a custom message to the first user 104. In accordance with an embodiment, the first electronic device 102 may be configured to automatically open a door of the premises 120 based on the recognition of the first user 104. The first electronic device 102 may also be configured to transmit custom messages and/or alerts to the second electronic device 106a, such as a smartphone, or one or more other electronic devices, which may be pre-registered to receive such messages or alerts.

The second electronic device 106a may include suitable logic, circuitry, and/or code configured to receive alerts and/or custom messages from the first electronic device 102 when the first user 104 visits the premises 120. The second electronic device 106a may include an application, which may facilitate to set various configuration settings associated with the first electronic device 102 and the plurality of network devices 112. The second electronic device 106a may be registered with the first electronic device 102 and/or the server 110, by use of the application pre-installed at the second electronic device 106a. During or after the registration, the second user 108a may set the various configuration instructions, via a user interface of the application. In accordance with an embodiment, the second user 108a may correspond to an occupant or resident of the premises 120 associated with the first electronic device 102.

The third electronic device 106b and the fourth electronic device 106c may be similar to that of the second electronic device 106a. The third electronic device 106b and the fourth electronic device 106c may also be registered with the first electronic device 102 and/or the server 110, by use of the application pre-installed at the second electronic device 106a. Alternatively, the third electronic device 106b and the fourth electronic device 106c may be registered by separate applications that may be pre-installed at the third electronic device 106b and the fourth electronic device 106c. Examples of the second electronic device 106a, the third electronic device 106b and the fourth electronic device 106c may include, but not limited to, a smartphone, a mobile device, a wearable device, a tablet computer, a laptop, and/or a personal computer.

In accordance with an embodiment, the third user 108b associated with the third electronic device 106b and the fourth user 108c associated with the fourth electronic device 106c may be co-occupants of the premises 120. In accordance with an embodiment, the third user 108b and the fourth user 108c may be family members of the second user 108a that may reside at the premises 120. Alternatively, the third user 108b and the fourth user 108c may refer to friends or neighbors of the second user 108a.

The server 110 may comprise suitable logic, circuitry, interfaces, and/or code that may be configured to receive a registration request from the second electronic device 106a. The server 110 may also receive registration requests from the one or more other electronic devices, such as the third electronic device 106b and the fourth electronic device 106c. The registration requests may enable an electronic device to be registered for receipt of customized alerts and/or messages based on pre-configured instructions associated with communication of these messages. The server 110 may be configured to store a plurality of media items. In addition, the server 110 may store a repository of facial images, voice samples, and visitor history logs of known users or previous visitors of the premises 120. The server 110 may further store a repository of attributes in an associative relation to one or more preset possible physiological and/or behavioural characteristics of a user. The server 110 may be implemented a web server, a database server, a file server, an application server, a set of distributed servers or cloud servers. The server 110 may be implemented by use of several technologies that are well known to those skilled in the art.

The plurality of network devices 112 may comprise suitable logic, circuitry, interfaces, and/or code that may be configured to play back pre-specified media items. In accordance with an embodiment, each of the plurality of network devices 112 may be installed in (or associated) with premises of a respective user of that network device. For instance, the first network device 112a may be installed at premises associated with the first remote user 114a. Similarly, the second network device 112b and the third network device 112c may be respectively installed at premises associated with the second remote user 114b and the third remote user 114c. In accordance with an embodiment, each of the plurality of network devices 112 may be similar to the first electronic device 102. The plurality of network devices 112 may correspond to a smart door bell, a security device, a smart door, an electronic security lock, and/or a surveillance system provided at the premises of a respective remote user.

The first communication network 116 may include a medium through which the first electronic device 102 may communicate with the second electronic device 106a, the third electronic device 106b, the fourth electronic device 106c, and/or the server 110. The first communication network 116 may be implemented by one or more wireless communication technologies known in the art. Examples of the first communication network 116 may include, but not be limited to, a Bluetooth based network, a Wi-Fi based network, a Light-Fidelity (Li-Fi) based network, a short-range wireless communication network, and/or a Wi-Max based network. In accordance with an embodiment, the first communication network 116 may include a cellular network, Long Term Evolution (LTE) network, and/or the Internet.

The second communication network 118 may include a medium through which the first electronic device 102 may communicate with the plurality of network devices 112. The second communication network 118 may be implemented by one or more wireless communication technologies known in the art. Examples of the wireless communication networks may include, but not limited to, the Internet, an Intranet, a cellular telephone network, a wireless local area network (LAN), and/or a metropolitan area network (MAN).

The premises 120 may correspond to residential or commercial building, an establishment, or a space that may include an entrance that may be monitored by the first electronic device 102, by use of one or more cameras or microphones.

In operation, the first electronic device 102 may be configured to capture one or more images or video of the first user 104 by use of an image-capturing unit. The first electronic device 102 may be further configured to capture (or record) voice samples of the first user 104. The one or more images, such as facial images, video, and/or the voice samples of the first user 104 may be captured when the first user 104 visits the premises 120, and is detected in a close proximity to the first electronic device 102.

In accordance with an embodiment, the first electronic device 102 may be configured to detect one or more physiological and/or behavioural characteristics of the first user 104. The one or more physiological and/or behavioural characteristics of the first user 104 may correspond to facial features, a voice pattern, a clothing pattern, an emotional state, a current activity of the first user 104, and/or one or more objects held or worn by the first user 104. The captured one or more images, video, and/or the voice samples of the first user 104 may be used for detection of the one or more physiological and/or behavioural characteristics of the first user 104.

In accordance with an embodiment, the first electronic device 102 may be configured to identity the first user 104 based on detected one or more physiological and/or behavioural characteristics of the first user 104. In accordance with an embodiment, the first user 104 may be identified based on recognition of a combination of facial features and the captured voice sample of the first user 104. Further, the first electronic device 102 may employ one or more machine learning techniques to recognize the first user 104 based on previous facial images and voice samples of the first user 104, captured during his/her previous visit to the premises 120.

In accordance with an embodiment, the first electronic device 102 may be configured to determine one or more attributes associated with the detected one or more physiological and/or behavioural characteristics of the first user 104. The one or more attributes of the first user 104 may include an identity of the first user 104 (based on the identification), a profession of the first user 104, an event associated with the first user 104, and/or a date-of-interest, such as a birthday, a marriage anniversary date, associated with the first user 104. The one or more attributes may further include a type of relationship of the first user 104 (who may be a visitor of the premises 120) and the second user 108a (who may be the occupant of the premises 120).

In accordance with an embodiment, the one or more attributes may include a visit history of the first user 104 and/or a pre-configured schedule of visit of the first user 104 to the premises 120. The one or more attributes may also include a purpose of previous visits of the first user 104 to the premises 120 or premises of others users, such as the first remote user 114a or the second remote user 114b, associated with respective network devices of the plurality of network devices 112. Such information related to the visit history, the pre-configured schedule, and the purpose of previous visits, may be centrally stored in a cloud server, such as the server 110.

In accordance with an embodiment, the first electronic device 102 may be configured to retrieve one or more media items from the plurality of media items in accordance with the determined one or more attributes of the first user 104. The one or more media items may be retrieved from the server 110 or an inbuilt storage device of the first electronic device 102. Thereafter, the first electronic device 102 may play back a media item from the retrieved one or more media items for the first user 104 (such as the visitor), based on the preset configuration instructions. In other words, based on the preset configuration instructions, custom chimes may be played that may uniquely identify a visitor, such as the first user 104. Such custom chimes may be one of the retrieved one or more media items. Further, the first electronic device 102 may communicate at least one of the retrieved one or more media items to the pre-registered second electronic device 106a, such as a smartphone, of the second user 108a (such as the occupant) for play back on the second electronic device 106a. Further, in accordance with an embodiment, a playlist may be preset to playback certain chimes for a visitor, such as the first user 104. The preset playlist may be pushed to the first electronic device 102 at run-time from an application pre-installed at a smartphone, such as the pre-registered second electronic device 106a. The preset playlist may be edited or customized for different visitors, such as the first user 104. Alternatively, in accordance with an embodiment, one or more media items, such as chime sounds or selected songs, may be directly pushed from the application pre-installed at the smartphone, such as the pre-registered second electronic device 106a, or from a home network or a cloud server, such as the server 110, to the first electronic device 102, such as the smart door bell.

In accordance with an embodiment, different media items from the retrieved one or more media items may be played back at the first electronic device 102 for the first user 104 and/or the pre-registered second electronic device 106a for the second user 108a. In accordance with an embodiment, the first electronic device 102 may be configured to communicate an alert message to the pre-registered second electronic device 106a. The alert message may include a first media item from the retrieved one or more media items. The second electronic device 106a may be configured to play back the first media item received from the first electronic device 102.

In accordance with an embodiment, the first electronic device 102 may receive a second media item from the second electronic device 106a in response to the communication of the alert message to the second electronic device 106a. The received second media item may be played back at the first electronic device 102 for the first user 104. Alternatively, in accordance with an embodiment, the first electronic device 102 may not receive the second media item from the second electronic device 106a.

In accordance with an embodiment, current location information of the pre-registered second electronic device 106a and/or one or more other pre-registered electronic devices, such as the third electronic device 106b and/or the fourth electronic device 106c, may be received. In accordance with an embodiment, the current location information may be received directly from the second electronic device 106a and the one or more other pre-registered electronic devices, via the first communication network 116. In accordance with an embodiment, the current location information may be retrieved from the server 110. In such an embodiment, the second electronic device 106a and the one or more other pre-registered electronic devices may periodically communicate respective location information to the server 110. The first electronic device 102 may then receive (or retrieve) such location information from the server 110.

In accordance with an embodiment, the retrieval of the one or more media items by the first electronic device 102 may be further based on the received current location information. The one or more occupants of the premises 120, such as the second user 108a, the third user 108b and the fourth user 108c, may be associated with the second electronic device 106a and/or one or more other pre-registered electronic devices, as shown in FIG. 1. The current location information may indicate a presence or an absence of the one or more occupants of the premises 120 at a preset location (such as preset location of installation of the first electronic device 102) of the premises 120.

In accordance with an embodiment, the first electronic device 102 may transmit the first media item from the retrieved one or more media items to the one or more other pre-registered electronic devices, such as the third electronic device 106b. The transmission may be performed when the second electronic device 106a is irresponsive to the communicated alert message or media items. That is, if the second electronic device 106a does not respond within a pre-specified time from the communicated first media item, the first electronic device 102 may re-transmit the first media item to the one or more other pre-registered electronic devices.

In accordance with an embodiment, one or more other media items may be retrieved from the plurality of media items in accordance with the determined one or more attributes associated with the first user 104. The one or more other media items may be retrieved when the received current location information of the second electronic device 106a indicates that the second user 108a is present at one of a plurality of preset locations of known users. The preset location of the known users may correspond to a location of a network device from the plurality of network devices 112.

In accordance with an embodiment, the first electronic device 102 may control play back of the retrieved one or more other media items on a specific network device associated with the one of the plurality of preset locations. For instance, the current location information of the second electronic device 106a may indicate that the second user 108a may be present at a location associated with premises of the first remote user 114a. Thus, the first electronic device 102 may transmit the one or more other media items to the first network device 112a and control play back of the one or more other media items on the first network device 112a. For instance, the first remote user 114a associated with the first network device 112a may correspond to a friend of the second user 108a. A customized message, such as "<the first user 104> is standing outside <the second user 108a> home <the premises 120>", may be mandatorily played out on the first network device 112a. The second user 108a present at the location associated with premises of the first remote user 114a, may become aware of the visit of the first user 104 at the premises 120 of the second user 108a.

In accordance with an embodiment, the first electronic device 102 may be configured to determine whether to grant an access to the premises 120 of the second user 108a. The determination of whether to grant the access may be based on the determined one or more attributes and/or a result of a temporal analysis of the determined one or more attributes by use of a machine learning technique. In accordance with an embodiment, the first electronic device 102 may receive an authorization instruction from the second electronic device 106a to automatically unlock a door to grant an access to the premises 120 of the second user 108a.

Figure 2:
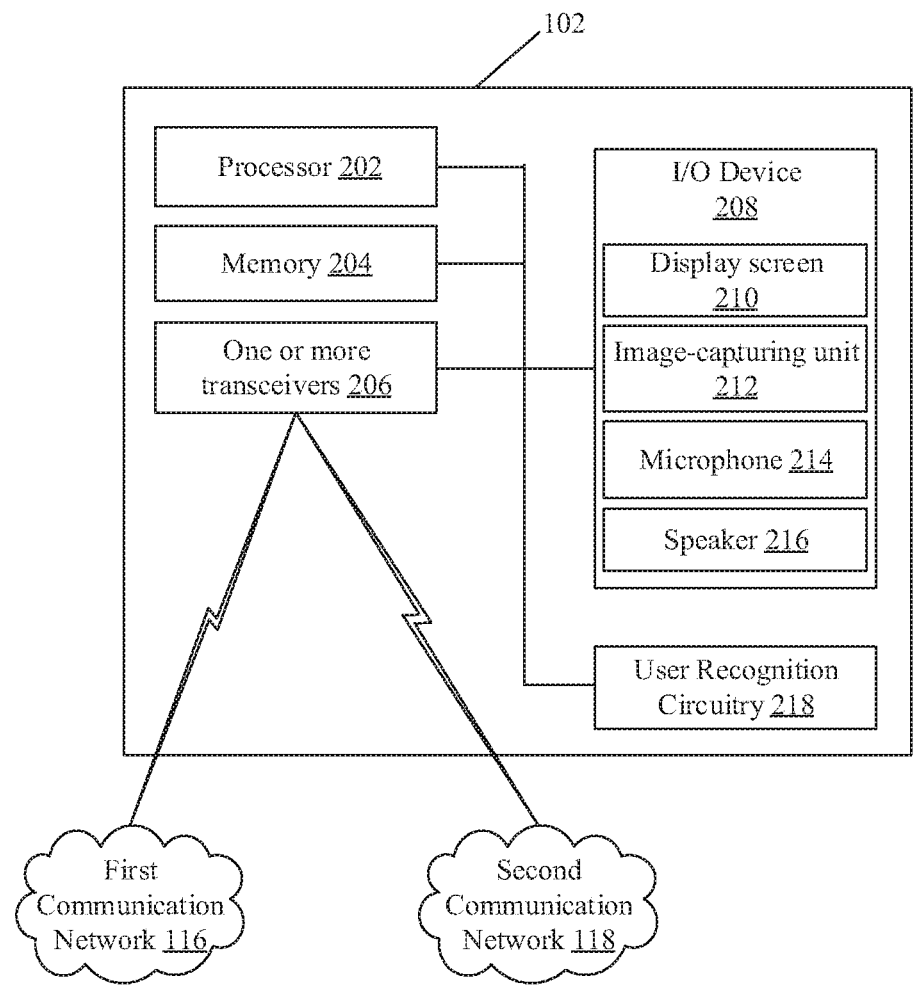
FIG. 2 is a block diagram that illustrates an exemplary electronic device for customized message playback, in accordance with an embodiment of the disclosure.

FIG. 2 is a block diagram that illustrates an exemplary electronic device for customized message playback, in accordance with an embodiment of the disclosure. FIG. 2 is explained in conjunction with elements from FIG. 1. With reference to FIG. 2, there is shown the first electronic device 102. The first electronic device 102 may include a processor 202, a memory 204, and one or more transceivers 206. The first electronic device 102 may further include an input/output (I/O) device 208. The I/O device 208 may include a display screen 210, an image-capturing unit 212, a microphone 214, and a speaker 216. The first electronic device 102 may also include a user recognition circuitry 218.

In accordance with an embodiment, the processor 202 may be communicatively coupled to the memory 204, the one or more transceivers 206, the I/O device 208, and/or the user recognition circuitry 218, via a system bus. Though shown as a part of the first electronic device 102, the I/O device 208 may be implemented as a separate component that may be communicatively coupled to the first electronic device 102.

The processor 202 may comprise suitable logic, circuitry, interfaces, and/or code that may be configured to execute a set of instructions stored in the memory 204. In accordance with an embodiment, the processor 202 may be configured to perform operations associated with the first electronic device 102, based on execution of the set of instructions stored in the memory 204. The processor 202 may be implemented, based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors or control circuits.

The memory 204 may comprise suitable logic, circuitry, and/or interfaces that may be configured to store a set of instructions executable by the processor 202. The memory 204 may be further configured to store pre-selected media items retrieved from a plurality of media items for play back at various electronic devices. The memory 204 may also store pre-configured instructions associated with the communication and play back of custom messages, such as specific media items, and/or alerts on the various electronic devices. Examples of implementation of the memory 204 may include, but not limited to, Random Access Memory (RAM), Read Only Memory (ROM), Hard Disk Drive (HDD), Flash memory, and/or a Secure Digital (SD) card.

The one or more transceivers 206 may comprise suitable logic, circuitry, interfaces, and/or code that may be configured to communicate with the second electronic device 106a, the one or more pre-registered other electronic devices, via the first communication network 116. The one or more transceivers 206 may be further configured to communicate with the plurality of network devices 112, via the second communication network 118. The one or more transceivers 206 may implement known technologies to support at least one of wireless, mesh, clustered-node, or peer-to-peer (P2P) communication. The one or more transceivers 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, Bluetooth (BT), near-field communication (NFC), and/or a local buffer. The one or more transceivers 206 may communicate via wireless communication with networks, such as the Internet, an Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The I/O device 208 may comprise suitable logic, circuitry, interfaces, and/or code for various input and output devices that may be configured to communicate with the processor 202. The I/O device 208 may be configured to receive an input from a user (such as the first user 104). The input from the first user 104 may correspond to a voice command or voice sample captured by the microphone 214. Examples of the input devices may include, but are not limited to, the image-capturing unit 212, such as a camera or a camcorder, the microphone 214, a touch screen, a motion sensor, a light sensor, and/or a docking station. The I/O device 208 may also be configured to provide an output to the first user 104. The output may correspond to audio and/or video output that may correspond to play back of the retrieved one or more media items, via the display screen 210 and/or the speaker 216, for the first user 104. The play back may be a customized play back in response to the identification of the first user 104, based on the combination of voice/facial features of the first user 104. Examples of the output devices may include, but may not be limited to, the display screen 210, a projector screen, and/or the speaker 216.

The display screen 210 may comprise suitable circuitry and/or interfaces that may be configured to display image and/or video output to the first user 104. The display screen 210 may be configured to receive one or more input actions from the first user 104, via a touch sensitive screen. Such one or more input actions may be received from the first user 104, by means of a virtual keypad, a stylus, a touch-based input action, and/or a gesture. In accordance with an embodiment, the one or more input actions may not be required from the first user 104. The display screen 210 may be realized through several known technologies such as, but not limited to, Liquid Crystal Display (LCD) display, Light Emitting Diode (LED) display, plasma display, and/or Organic LED (OLED) display technology, and/or other display.

The image-capturing unit 212 may comprise suitable logic, circuitry, interfaces, and/or code for capture of one or more images or video of a visitor (such as the first user 104) of the premises 120. The one or more images may be captured to determine one or more facial features of the first user 104 for use in identification of the first user 104 based on face recognition. In accordance with an embodiment, the image-capturing unit 212 may correspond to a front-facing camera or a video recorder of the first electronic device 102, to capture the one or more images. Examples of the image-capturing unit 212 may include, but not limited to, a Charge-Coupled Device (CCD) based image-sensor, and/or a Complementary Metal Oxide Semiconductor (CMOS) based image-sensor. A person skilled in the art may understand that the image-capturing unit 212 may or may not be provided as in-built unit in the first electronic device 102.

The microphone 214 may comprise suitable circuitry and/or interfaces to receive an audio input. The audio input may correspond to a voice sample of the first user 104. The voice sample of the first user 104 may be recorded by the microphone 214 to perform voice based recognition of the first user 104. Further, the first user 104 may be enabled to record a voice message for the second user 108*a* through the microphone 214. The voice message, so recorded, may be played back on the second electronic device 106*a* for the second user 108*a*. A person skilled in the art may understand that the microphone 214 may or may not be provided as an in-built unit in the first electronic device 102.

The speaker 216 may comprise suitable circuitry and/or interfaces to generate an audio output for the first user 104. In accordance with an embodiment, the speaker 216 may be configured to play back a customized message for the first user 104 based on recognition of the first user 104. The customized message may include a media item retrieved from the plurality of media items based on the detected one or more attributes of the first user 104. A person skilled in the art may understand that the speaker 216 may or may not be provided as an in-built unit in the first electronic device 102.

The user recognition circuitry 218 may comprise suitable logic, circuitry, interfaces, and/or code that may be configured to detect one or more physiological and/or behavioural characteristics of a visitor (such as the first user 104) of the premises 120. Further, the user recognition circuitry 218 may be configured to determine an identity of the visitor based on a combination of facial features and voice sample of the visitor (such as the first user 104).

In accordance with an embodiment, the user recognition circuitry 218 may be a part of the processor 202. Alternatively, the user recognition circuitry 218 may be implemented as a separate processor or circuitry in the first electronic device 102. In accordance with an embodiment, the user recognition circuitry 218 and the processor 202 may be implemented as an integrated processor or a cluster of processors that perform the functions of the user recognition circuitry 218 and the processor 202. In accordance with an embodiment, the user recognition circuitry 218 may be implemented as a set of instructions stored in the memory 204, which upon execution by the processor 202 may perform the functions of the user recognition circuitry 218.

In operation, the user recognition circuitry 218 of the first electronic device 102 may be configured to detect one or more physiological and/or behavioural characteristics of the first user 104. The processor 202 and/or the user recognition circuitry 218 may be configured to capture one or more facial images and voice samples of the first user 104. The user recognition circuitry 218 may identify the first user 104 based on a combination of facial recognition (by use of the one or more facial images) and voice recognition (by use of the voice sample).

In accordance with an embodiment, the user recognition circuitry 218 may transmit the one or more facial images and the voice sample to the server 110 for recognition. The one or more physiological and/or behavioural characteristics may be determined based on the identification of the user and/or analysis of the image of the first user 104. Thereafter, the processor 202 may determine one or more attributes associated with the one or more physiological and/or behavioural characteristics of the first user 104. Further, the processor 202 may retrieve one or more media items from the plurality of media items stored on the server 110. The retrieval of the one or more media items may be based on the one or more attributes of the first user 104. Thereafter, the processor 202 may play back a media item from the retrieved one or more media items for the first user 104 via the display screen 210 and the speaker 216 based on the pre-specified configuration instructions stored in the memory 204.

In accordance with an embodiment, the processor 202 may communicate the retrieved one or more media items including another media item to the pre-registered second electronic device 106*a* for play back on the second electronic device 106*a*. In accordance with an embodiment, different media items from the retrieved one or more media items may be played back at the first electronic device 102 for the first user 104 and/or the pre-registered second electronic device 106*a* for the second user 108*a*. An exemplary scenario of identification of the first user 104, determination the one or more attributes of the first user 104, and custom message playback based on the one or more attributes is explained in FIG. 3.

In accordance with an embodiment, the retrieval and playback of media items may also be based on location information of the pre-registered electronic devices. An exemplary scenario for custom message playback based on the location information of the pre-registered electronic devices is explained in FIG. 4. Further, custom messages may be sent to specific network devices based on events and/or date-of-interest associated with a user of that network device. In addition, custom messages may be sent for playback to a first set of network devices that may be selected from the plurality of network devices 112 based on current location information of the second electronic device 106*a*. An exemplary scenario of custom message playback on the specific network device and/or a first set of network devices of the plurality of network devices 112, is explained in FIG. 5.

Figure 3:
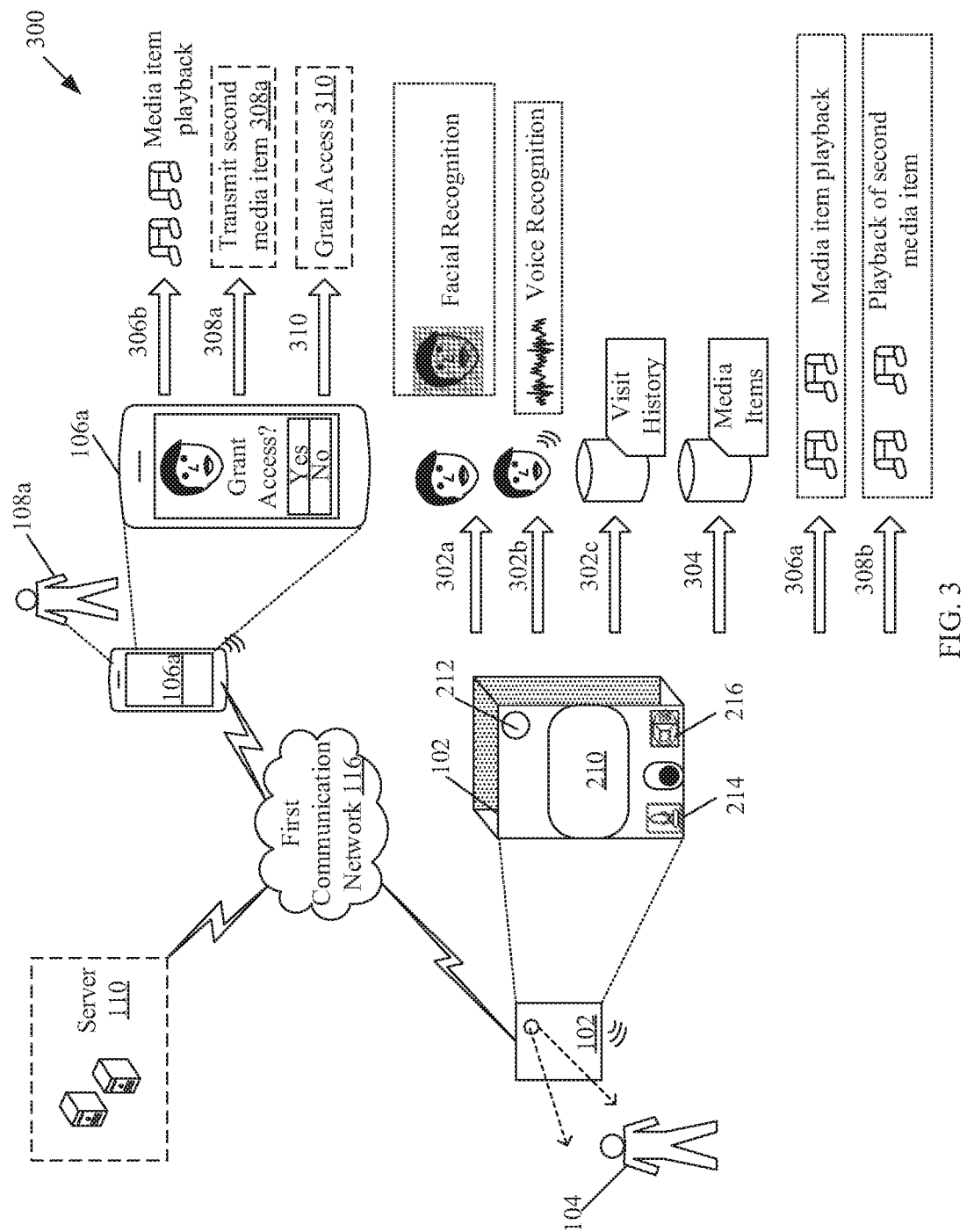
FIG. 3 illustrates a first exemplary scenario for implementation of the disclosed system and method for customized message playback, in accordance with an embodiment of the disclosure.

FIG. 3 illustrates a first exemplary scenario for implementation of the disclosed system and method for customized message playback, in accordance with an embodiment of the disclosure. With reference to FIG. 3, there is a shown a first exemplary scenario 300, which is described in conjunction with elements from FIGS. 1 and 2. The first exemplary scenario 300 includes the first electronic device 102 that may be installed in the premises 120 (FIG. 1; not shown in FIG. 3). There is shown the first user 104 who may visit the premises 120, the second electronic device 106a and the second user 108a associated with the second electronic device 106a.

The first exemplary scenario 300 may also include the server 110 and the first communication network 116. As shown in FIG. 3, the first communication network 116 may connect the first electronic device 102, the second electronic device 106a, and the server 110. Further, the first electronic device 102 is shown to include the display screen 210, the image-capturing unit 212, the microphone 214, and the speaker 216. As shown in FIG. 3, the first electronic device 102 may perform processing steps 302a, 302b, 302c, 304, 306a, and 308b. Further, the second electronic device 106a may perform processing steps 306b, 308a, and 310.

In accordance with the first exemplary scenario 300, the second electronic device 106a may include an application installed therein to interface with the first electronic device 102, such as a smart security device or a smart doorbell device. The second user 108a may provide an input, via the user interface of the application, to register the second electronic device 106a at the server 110 and/or the first electronic device 102. To that end, the second electronic device 106a may transmit a registration request to the first electronic device 102 and/or the server 110. The request may also include pre-specified configuration instructions set by the second user 108a.

For example, the pre-specified configuration instructions may include a list of the one or more attributes that may be used as criteria for media item retrieval or play back. Further, the pre-specified configuration instructions may include pre-specified conditions and pre-selected media items to be played back for visitors or pre-registered occupants as per pre-specified conditions and identification of the visitors. For instance, in a condition where the first user 104 corresponds to a friend or family member, a welcome tune, such as "Welcome my friend Peter", may be played back to the visitor, such as the first user 104. Another tune, such as "Peter is standing outside, open the door", may be played back to the occupant, such as the second user 108a.

The registration may enable the second electronic device 106a to interface with the first electronic device 102 installed at the premises 120. The registration of the second electronic device 106a may enable the second electronic device 106a to receive custom messages and/or alerts from the first electronic device 102. Further, the registration may enable the second electronic device 106a to transmit media items to other electronic devices for storage or play back on that electronic device.

In accordance with an embodiment, when the first user 104 visits the premises 120, the first electronic device 102 may detect arrival of a visitor based on a pre-specified proximity of the first user 104 to the first electronic device 102. In accordance with an embodiment, an input on the first electronic device 102, such as a press a push button (not shown) may indicate an arrival of the first user 104 at the premises 120. The first electronic device 102 may prompt the first user 104 to provide a voice sample through the microphone 214. In addition, the image-capturing unit 212 may capture one or more images of the first user 104.

In accordance with an embodiment, the user recognition circuitry 218 of the first electronic device 102 may be configured to determine one or more physiological and/or behavioural characteristics of the first user 104. The one or more physiological and/or behavioural characteristics may be determined based on facial recognition, voice recognition, and visit trend analysis. The facial recognition, voice recognition, and visit trend analysis steps are illustrated in FIG. 3, as processing steps 302a, 302b, and 302c, respectively.

At processing step 302a, the user recognition circuitry 218 of the first electronic device 102 may send the captured one or more images, such as facial images, of the first user 104 to the server 110 for analysis. The server 110 may store a repository of facial images of known users. The server 110 may apply one or more pattern detection or face detection techniques and/or one or more image processing techniques to identify one or more facial features of the first user 104. Thereafter, the one or more facial features may be compared with pre-stored facial features in the repository of facial images to determine an identity of the first user 104.

The user recognition circuitry 218 may receive the identified one or more facial features and determined identity of the first user 104 from the server 110. In addition to the one or more facial images, the user recognition circuitry 218 may also transmit one or more full-length images (that capture complete body or a portion of the body) of the first user 104 to the server 110 for analysis. Based on the one or more full-length images, the server 110 may determine one or more other physiological and/or behavioural characteristics, such as a clothing pattern, an emotional state, a current activity of the first user 104, and/or one or more objects held (such as books, knife, or other objects) or worn by the first user 104. The clothing pattern may indicate a profession, such as a doctor, a postman, or age of the first user 104. The server 110 may transmit these determined physiological and/or behavioural characteristics to the first electronic device 102.

At processing step 302b, the user recognition circuitry 218 may send the captured voice sample of the first user 104 to the server 110 for analysis. The server 110 may include a repository of voice samples of known users. The server 110 may apply one or more sound filters on the voice sample of the first user 104 to obtain an audio signature of the voice sample. Thereafter, the server 110 may compare the obtained audio signature of the voice sample of the first user 104 with pre-stored audio signatures of the voice samples of known users stored in the repository of voice samples. Based on the comparison of audio signatures, the server 110 may determine the identity of the first user 104. The processor 202 of the first electronic device 102 may receive the identity of the first user 104 from the server 110, via the first communication network 116. The identity of the first user 104 may be determined and cross-checked based on a combination of facial recognition (based on the one or more facial images) and voice recognition (based on the voice sample).

At processing step 302c, the user recognition circuitry 218 of the first electronic device 102 may transmit a request to the server 110, via the one or more transceivers 206, for analysis of a visit trend of the first user 104. The request may include the identity of the first user 104, current date and time, and the determined one or more physiological and/or behavioural characteristics of the first user 104 in the present visit to the premises 120. The server 110 may include a repository of attributes of known users correlated with identity of the known users and visit history log of previous visits of the known users to the premises 120 and/or other premises of other known users.

On receipt of the request from the user recognition circuitry 218, the server 110 may use the identity of the first user 104 to retrieve records associated with the first user 104 from the visit history repository. The retrieved records may include visit history log of the previous visits of the first user 104 to the premises 120 and the correlated one or more attributes of the first user 104. In accordance with an embodiment, the server 110 may analyze the visit history log to determine past trends of the one or more physiological and/or behavioural characteristics of the first user 104. Further, the server 110 may correlate the presently determined one or more physiological and/or behavioural characteristics of the first user 104, received from the first electronic device 102, with past trends determined from the analyzed visit history log.

Based on the correlation, the server 110 may determine one or more current attributes of the first user 104 in accordance with the received one or more physiological and/or behavioural characteristics of the first user 104. The user recognition circuitry 218 and/or the processor 202 of the first electronic device 102 may receive the determined one or more attributes of the first user 104, from the server 110. Further, the server 110 may update visit history repository including the visit history log associated with the first user 104 to include details related to the current visit of the first user 104 to the premises 120. The details related to the current visit of the first user 104 may include the determined one or more current attributes of the first user 104.

At processing step 304, the processor 202 of the first electronic device 102 may retrieve one or more media items from a plurality of media items based on the determined one or more current attributes of the first user 104. In accordance with an embodiment, the server 110 may store a repository of media items including the plurality of media items. The processor 202 of the first electronic device 102 may send a query for retrieval of the one or more media items to server 110. The query may include the determined one or more current attributes. Alternatively, the plurality of media items may be stored in the memory 204 of the first electronic device 102. The processor 202 may retrieve the one or more media items from the memory 204, in such a case. Examples of the one or more attributes may include, but not limited to, an identity of the first user 104, a profession of the first user 104, an event associated with the first user 104, a date-of-interest associated the first user 104. The one or more attributes may further include a type of relationship between the first user 104 and the second user 108a, a visit history of the first user 104. In addition, the one or more attributes may include a pre-configured schedule of visit of the first user 104 to the premises, and/or a purpose of visit of previous visits of the first user 104 to the premises 120 or other premises.

For example, the one or more attributes may indicate that the identity of the first user 104 is "Peter". Thus, the one or more retrieved media items may be customized for "Peter", such as a custom tone and a welcome message for "Peter", based on the pre-specified preferences. In another example, if the first user 104 may be an individual with a profession of "postman" (determined based on the clothing pattern), the first user 104 may be greeted accordingly. Further, a custom media item may be retrieved and played back in this case, which may instruct the first user 104 to place the new mails and/or periodicals in a mailbox. A password or location of a key of the mail-box may be provided to the first user 104 through the custom message in case the first user 104 may be identified as a trusted/known postman based on the visit trend analysis.

In another example, if an event and/or date-of-interest associated with the first user 104 match with the current date and/or time of identification, a media item may be accordingly selected from the plurality of media items for play back to the first user 104, via the speaker 216. Examples of such events and/or date-of-interest may include, but not limited to, a birthday, an anniversary, and/or an academic or sports performance of the first user 104. For instance, a birthday tune may be selected from the plurality of media items, in case the first user 104 has a birthday on the day of visit to the premises, a previous day (belated birthday), or a next day (upcoming birthday).

In another example, the media items retrieved from the plurality of media items may be based on a type of relationship between the first user 104 and the second user 108a. For instance, three relationship types, such as family-and-friends, neighbors, and acquaintances/others, may be specified by the second user 108a via the user interface of the pre-installed application. Accordingly, different media items may be retrieved for the first user 104 who may belong to a particular relationship type. In addition, the retrieval of media items from the plurality of media items may also be based on the visit history of the first user 104, pre-configured visit schedule, and/or purpose of previous visits of the first user 104 to the premises 120. For instance, a technician of a consumer electronic good, such as a television, refrigerator, air conditioner, washing machine, and/or dish washer, may periodically visit the premises 120 to undertake service of the consumer electronic good installed in the premises 120. The periodicity may be quarterly or annual based on service requirement of the consumer electronic good and a service contract of the second user 108a with the technician's organization. Thus, once the technician is recognized and visit schedule and purpose of visit of the technician correlate with details of previous visits stored in the visit history log, custom media items may be retrieved for the technician. For example, a welcome message followed by details associated with the relevant consumer electronic goods may be provided as an audio/video output to the technician through the first electronic device 102. The details associated with the consumer electronic goods may be retrieved from the server 110, which may store a repository that may maintain such information.

In accordance with an embodiment, once the one or more media items are retrieved at processing step 304, the processor 202 may transmit the one or more media items to pre-registered one or more electronic devices. The second electronic device 106a may be an example of such electronic device, which may be pre-registered to receive custom messages and/or alerts from the first electronic device 102. The processor 202 may transmit the retrieved one or more media items to the second electronic device 106a, via the first communication network 116, through the one or more transceivers 206. The one or more media items may be transmitted for playback at the second electronic device 106a.

At processing step 306a, the processor 202 may playback a media item from the retrieved one or more media items for the first user 104 on the first electronic device 102. The selection of the media item for the playback to the first user 104 may be based on one or more pre-configured instructions or preferences received from the second electronic device 106a, during pre-registration of the second electronic device 106a. Video content of the media item may be played back on the display screen 210, while audio content of the media item may be played back through the speaker 216 of the first electronic device 102.

For the second electronic device 106a, at processing step 306b, the second electronic device 106a may also receive at least one of the retrieved one or more media items for playback to the second user 108*a* (the occupant of the premises 120) on the second electronic device 106*a*. The play back may be based on one or more pre-configured instructions or preferences of the second user 108*a* set during pre-registration of the second electronic device 106*a*. The second electronic device 106*a* may playback the received media item to the second user 108*a*, via a user interface of the application, of the second electronic device 106*a*. In accordance with an embodiment, different media items from the retrieved one or more media items may be played back on the first electronic device 102 and the second electronic device 106*a*.

In accordance with an embodiment, instead of (or in addition to) transmitting the one or more media items, the processor 202 may transmit an alert message to the second electronic device 106*a*, at the processing step 304. The alert message may include a first media item from the retrieved one or more media items. The first media item may be selected from the one or more retrieved media items based on the one or more attributes of the first user 104 and/or one or more pre-specified preferences of the second user 108*a*. For instance, a particular media item may be selected and sent as the alert message when the first user 104 is of a specific type, such as, a technician, a neighbor, or a friend, and so on. Hence, when such pre-specified type of the first user 104 visits the premises, the second user 108*a* may be sent a particular media item as a special alert on the second electronic device 106*a*.

In accordance with an embodiment, the alert message may also include a voice message or an audio/visual (A/V) message recorded by the first user 104 by use of the first electronic device 102. Further, on receipt of the alert message including first media item, the second electronic device 106*a* may transmit a second media item to the first electronic device 102, as illustrated in processing step 308*a*. The second media item may be pre-specified by the second user 108*a* for playback to the first user 104 of a specific type who visits the premises 120. The transmitted second media item may be received by the first electronic device 102 and played back to the first user 104, via the display screen 210 and the speaker 216. In accordance with an embodiment, the second media item may include a pre-configured message that may welcome the first user 104. The second media item may also include a voice message, a text message, and/or an A/V content provided by the second user 108*a* by use of the second electronic device 106*a*, for playback on the first electronic device 102 for the first user 104.

As shown in FIG. 3, the second electronic device 106*a* may present a facial image of the first user 104 via a display screen of the second electronic device 106*a*. Further, in case the first user 104 provides a message (such as a voice or an A/V message) through the first electronic device 102, the second electronic device 106*a* may receive such message from the first electronic device 102. The received message (such as the voice or A/V message) may be presented to the second user 108*a*, via the display screen and/or speakers of the second electronic device 106*a*. The second electronic device 106*a* may prompt the second user 108*a*, via a user interface of the second electronic device 106*a*, to grant the first user 104 an access to the premises. Based on an input of the second user 108*a* to the prompt, the second electronic device 106*a* may transmit an authorization acceptance or a deny instruction to the first electronic device 102 to remotely open a door or reject opening of the door to grant or deny the first user 104 an access to the premises 120. The transmission of the authorization (or access grant) instruction to the first electronic device 102 by the second electronic device 106*a* is illustrated in FIG. 3 by processing step 310.

In accordance with an embodiment, on receipt of the authorization acceptance instruction, the first electronic device 102 may automatically unlock the door to grant access to the premises 120 for the first user 104. In accordance with an embodiment, the first electronic device 102 may also be configured to automatically determine whether to grant the first user 104 an access to the premises 120. The automatic determination of whether to grant the access may be based on the determined one or more attributes and/or a temporal analysis of the determined one or more attributes (by analyzing visit history log) by use of machine learning techniques. The first electronic device 102 may automatically unlock the door of the premises 120 based on the automatic determination. For instance, if the first user 104 is a trustworthy person (such as a known technician) who visits the premises 120 quarterly, based on the temporal analysis of the one or more attributes, the first electronic device 102 may grant access to such a user. Alternatively, the first electronic device 102 may send the result of the automatic determination to second electronic device 106*a* for confirmation. If the second user 108*a* also agrees and grants a permission to the first user 104 to access the premises 120, the second electronic device 106*a* may accordingly send an indication to the first electronic device 102. The first electronic device 102 may accordingly control the unlocking of the door of the premises 120 for the first user 104.

Figure 4:
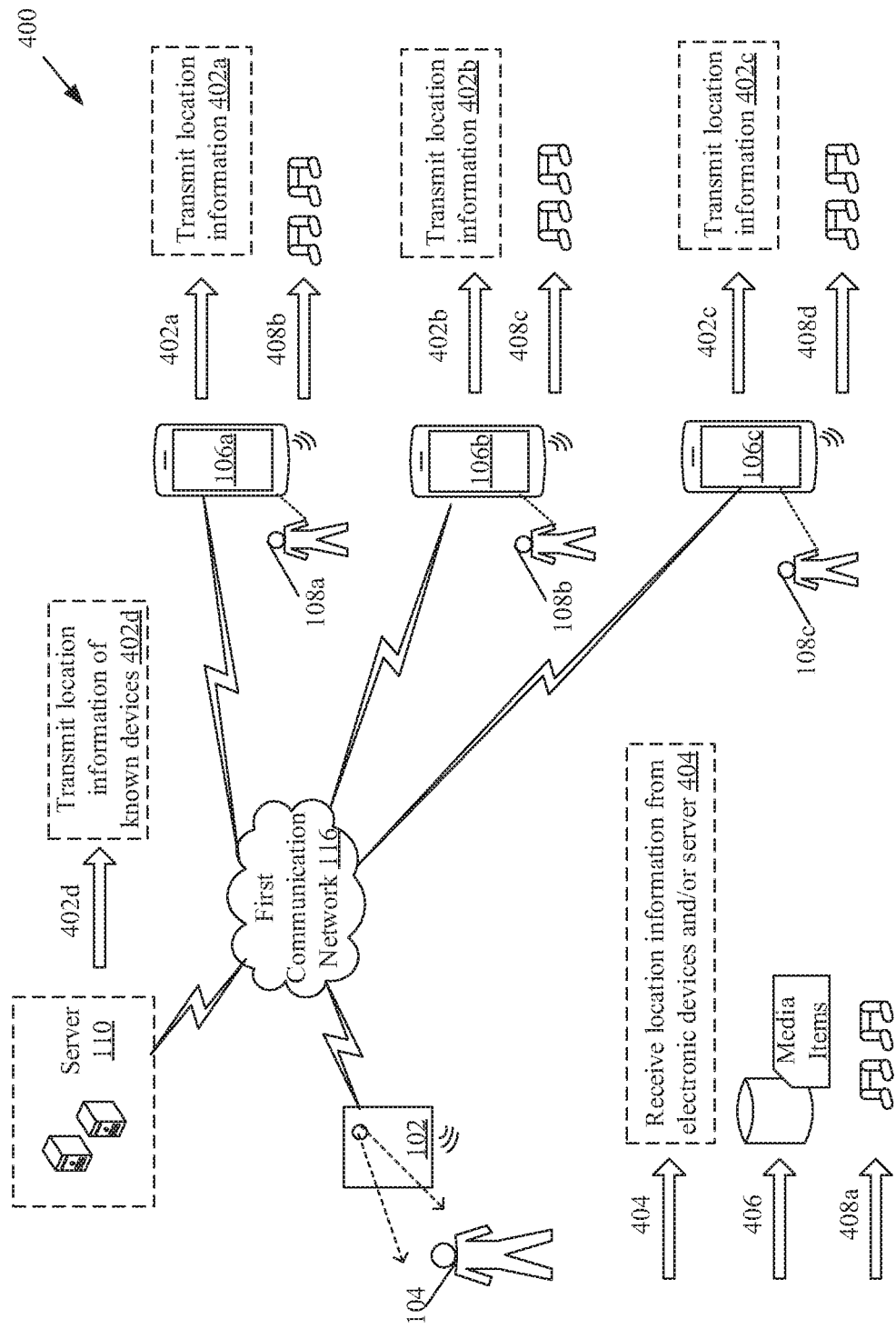
FIG. 4 illustrates a second exemplary scenario for implementation of the disclosed system and method for customized message playback, in accordance with an embodiment of the disclosure.

FIG. 4 illustrates a second exemplary scenario for implementation of the disclosed system and method for customized message playback, in accordance with an embodiment of the disclosure. With reference to FIG. 4, there is a shown a second exemplary scenario 400, which is described in conjunction with elements from FIGS. 1, 2, and 3. The second exemplary scenario 400 includes the first electronic device 102 that may be installed in the premises 120 and the first user 104 who may visit the premises 120. There is further shown the second electronic device 106*a*, the second user 108*a* associated with the second electronic device 106*a* and the server 110. In addition, there is shown in FIG. 4, the one or more other electronic devices, such as the third electronic device 106*b* and the fourth electronic device 106*c*. The one or more other electronic devices are shown to be associated with one or more other users, such as the third user 108*b* and the fourth user 108*c*, respectively.

The second exemplary scenario 400 may also include the first communication network 116. The first communication network 116 may connect the first electronic device 102, the second electronic device 106*a*, the one or more other electronic devices, and the server 110. As shown in FIG. 4, the first electronic device 102 may perform processing steps 404, 406, 408*a*. Further, the second electronic device 106*a* may perform processing steps 402*a* and 408*b*. The third electronic device 106*b* may perform processing steps 402*b* and 408*c*, while the fourth electronic device 106*c* may perform processing steps 402*c* and 408*d*. Further, the server 110 may perform processing step 402*d*.

In accordance with an embodiment, during or after the pre-registration of the second electronic device 106*a*, the second user 108*a* may select other electronic devices and/or network devices that are to be pre-registered for a customized message playback. Further, the second user 108*a* may set configuration instructions, via the pre-installed application in the second electronic device 106*a*, for selection of appropriate media items in pre-specified conditions and play back of these media items at pre-registered devices (described in detail below). For instance, the second user 108*a* may select the third electronic device 106*b* and the fourth electronic device 106*c* as the other pre-registered electronic devices. For the purpose of the second exemplary scenario 400, the second electronic device 106*a*, the third electronic device 106*b*, and the fourth electronic device 106*c* may be considered as the pre-registered electronic devices.

In accordance with an embodiment, the first user 104 may visit the premises 120 (FIG. 1) of the second user 108*a* and use the first electronic device 102 installed in the premises 120 to send a custom message/alert to the second user 108*a*. The first electronic device 102 may detect one or more physiological and/or behavioural characteristics of the first user 104. The first user 104 may be identified based on a combination of facial recognition (based on one or more facial images of the first user 104) and voice recognition (based on voice samples of the first user 104). Thereafter, one or more attributes associated with the first user 104 may be determined based on the detected one or more physiological and/or behavioural characteristics of the first user 104.

In accordance with an embodiment, when the first user 104 visits the premises, the first electronic device 102 may transmit a notification to each pre-registered electronic device. The notification may indicate the arrival of a new user (such as the first user 104) at the premises 120 and request for location information related to the pre-registered electronic devices which receives the notification. For instance, in the current scenario, the second electronic device 106*a*, the third electronic device 106*b*, and the fourth electronic device 106*c* are the pre-registered electronic devices. Each of these pre-registered electronic devices, may transmit their respective location information to the first electronic device 102. The transmission of the respective location information by each of the pre-registered electronic devices, is illustrated as processing steps 402*a*, 402*b*, and 402*c*, respectively.

Further, the server 110 may periodically collect location information from each pre-registered electronic device. In accordance with an embodiment, the server 110 may also receive the notification associated with the arrival of the first user 104 at the premises 120. On receipt of the notification, the server 110 may also transmit the last updated location information associated with each pre-registered electronic device. The transmission of the last updated location information of the various pre-registered electronic devices from the server 110 to the first electronic device 102 is illustrated as processing step 402*d* in FIG. 4.

As shown in FIG. 4, at processing step 404, the first electronic device 102 may receive the location information from one or more pre-registered electronic devices and/or the server 110. In accordance with an embodiment, the first electronic device 102 may verify the location information received from each of the pre-registered electronic devices with the location information of the corresponding pre-registered electronic device received from the server 110. Further, in a scenario where location information is not received from a pre-registered electronic device, the first electronic device 102 may use the last updated location information of that pre-registered electronic device, as received from the server 110.

At processing step 406, the first electronic device 102 may retrieve one or more media items from the plurality of media items stored in the server 110. Alternatively, if the plurality of media items is stored in the memory 204 of the first electronic device 102, the processor 202 of first electronic device 102 may retrieve the one or more media items from the memory 204. In accordance with an embodiment, the retrieval of the one or more media items may be based on the one or more attributes of the first user 104 and/or the current location information of each of the pre-registered electronic devices. The current location information of a pre-registered electronic device may indicate presence or absence a user associated with the pre-registered electronic device at a preset location of the premises 120.

The first electronic device 102 may transmit the retrieved one or more media items to one or more of the pre-registered electronic devices, based on the received location information of each of the re-registered electronic device. For instance, the one or more retrieved media items (or a pre-selected media item from the retrieved one or more media items) may be sent to a pre-registered electronic device present at the location of the premises 120 of the second user 108*a*. The first electronic device 102 may play back one of the retrieved media items for the first user 104. The play back on the first electronic device 102 for the first user 104 may be based on the configuration instructions pre-specified by the second user 108*a*. That is, a custom message including the media item selected from the one or more retrieved media items for the first user 104 may be played back on the first electronic device 102, as illustrated in processing step 408*a*.

As shown in FIG. 4, a selected media item from the retrieved one or more media items may be played back on each of the pre-registered electronic devices. The playback of the selected media item on the pre-registered electronic devices, such as the second electronic device 106*a*, the third electronic device 106*b*, and the fourth electronic device 106*c*, is illustrated in processing steps 408*b*, 408*c*, and 408*d*, respectively. The selection of the pre-selected media item from the retrieved one or more media items and the playback of the selected media item may be based on the location information of the respective pre-registered electronic device.

For instance, the second user 108*a* and the fourth user 108*c* may be present at the premises 120. In this case, at processing step 406, the first electronic device 102 may send a first media item to the second electronic device 106*a* and a second media item to the fourth electronic device 106*c*. In accordance with an embodiment, the first pre-selected media item sent to the second electronic device 106*a* may be different from the second media item sent to the fourth electronic device 106*c*, based on pre-specified configuration instructions. For example, the first media item sent to the second electronic device 106*a* may include a tune preferred by the second user 108*a*. The second media item may include a tune preferred by the fourth user 108*c* that may be sent to the fourth electronic device 106*c*. The second electronic device 106*a* and the fourth electronic device 106*c*, may playback the received first media item and the second media item, for the second user 108*a* and the fourth user 108*c*, respectively, as illustrated in processing steps 408*b* and 408*d*.

In accordance with an embodiment, based on the location information of the second electronic device 106*a*, the first electronic device 102 may initially send one of the one or more retrieved media item to the second electronic device 106*a*. The media item may be a customized media item for the second user 108*a*, such as with a custom tune ("Hi John <the second user 108*a*>, Peter <the first user 104> is standing outside the door of your home <the premises 120>"). If no response is received from the second electronic device 106*a* by the first electronic device 102 within a pre-specified time interval, the first electronic device 102 may select and send another media item to the fourth electronic device 106c. The fourth electronic device 106c may be chosen for the transmission of the other pre-specified media item based on the location information of the fourth electronic device 106c that may indicate its presence at the location of the premises 120. The other pre-specified media item sent to the fourth electronic device 106c may be customized for the fourth user 108c (another occupant), such as "John<the second user 108a> is not responding; Peter<the first user 104> is standing outside the door of your home <the premises 120>"). The communicated media item, in both the cases, may include a message that may indicate that the first user 104 has arrived at the premises 120. In accordance with an embodiment, a specific media item or tune may be played for a specific user based on the user identification.

In accordance with an embodiment, the pre-registered electronic devices that may be present at the location of the premises 120 may perform the associated processing steps of media item playback (that is, processing steps 408b, 408c, and 408d). For instance, as per the aforementioned example, the second electronic device 106a and the fourth electronic device 106c, may be present at the premises 120. Hence, respective media items from the one or more retrieved media items may be received by the second electronic device 106a and the fourth electronic device 106c. Further, the second electronic device 106a and the fourth electronic device 106c may play back the received media items, as shown in the processing steps 408b and 408d, respectively. However, if the third electronic device 106b is not present at the location of the premises 120, the third electronic device 106b may not receive a media item. Hence, the third electronic device 106b may not perform the corresponding media play back step, illustrated by the processing step 408c.

Figure 5:
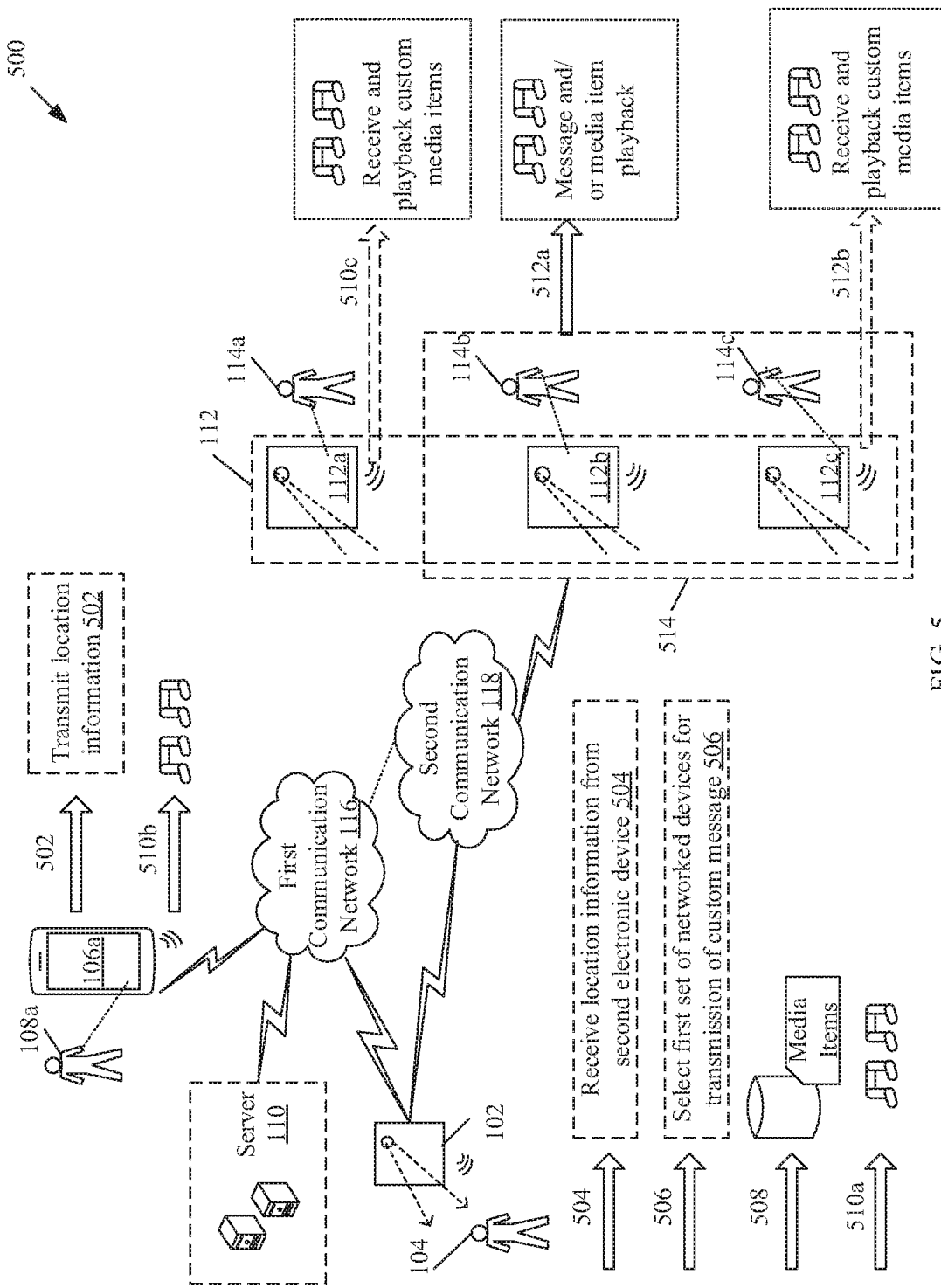
FIG. 5 illustrates a third exemplary scenario for implementation of the disclosed system and method for customized message playback, in accordance with an embodiment of the disclosure.

FIG. 5 illustrates a third exemplary scenario for implementation of the disclosed system and method for customized message playback, in accordance with an embodiment of the disclosure. With reference to FIG. 5, there is a shown a third exemplary scenario 500, which is described in conjunction with elements from FIGS. 1, 2, and 3. The third exemplary scenario 500 includes the first electronic device 102 that may be installed in the premises 120 and the first user 104 who may visit the premises 120. There is also shown the second electronic device 106a, the second user 108a associated with the second electronic device 106a, and the server 110. There is further shown in FIG. 5, the plurality of network devices 112 that may include the first network device 112a, the second network device 112b, and the third network device 112c. The first network device 112a may be associated with the first remote user 114a, while the second network device 112b may be associated with the second remote user 114b. The third network device 112c may be associated with the third remote user 114c.

The third exemplary scenario 500 may also include the first communication network 116 and the second communication network 118. The first communication network 116 may connect the first electronic device 102, the second electronic device 106a, and the server 110. The second communication network 118 may connect the first electronic device 102 and the plurality of network devices 112. As shown in FIG. 5, the first electronic device 102 may perform processing steps 504, 506, 508 and 510a to 510c. Further, the second electronic device 106a may perform processing steps 502 and 510b. The first set of network devices 514 may perform processing steps 510c, while the second network device 112b and the third network device 112c are shown to perform processing steps 512a and 512b, respectively. The third exemplary scenario 500 also depicts a first set of network devices 514 that may include one or more network devices from the plurality of network devices 112. For instance, the first set of network devices 514 is shown to include the second network device 112b and the third network device 112c.

In accordance with an embodiment, the second user 108a may provide input on the second electronic device 106a, via the user interface of the pre-installed application, for registration of each network device of the plurality of network devices 112. Further, the second user 108a may specify one or more rules for grouping of the network devices into various logical groups. For example, one or more network devices may be grouped into a first group associated with friends and family members of the second user 108a. One or more other network devices may be grouped into a second group associated with neighbors of the second user 108a.

In addition, the second user 108a may specify rules related to selection or play back of media items for network devices that belong to different groups. For instance, messages/alerts related to a visit by a user (such as the first user 104) to the premises 120 of the second user 108a may also be sent to each network device that belongs to a friends and family group, such as the first set of network devices 514. This may be the case when the second user 108a is out of station. Further, the messages/alerts related to a visit of the first user 104 of a specific type (such as a postman) may be sent to each network device that belongs to group of network devices belonging to neighbors of the second user 108a. For instance, through the playback of custom messages/alerts, the neighbors may be requested to keep the mail and/or periodicals related to the occupants of the premises 120 of the second user 108a.

In accordance with an embodiment, the first user 104 may visit the premises 120 of the second user 108a and use the first electronic device 102 installed in the premises to send a custom message/alert to the second user 108a. The first electronic device 102 may determine one or more physiological and/or behavioural characteristics of the first user 104. The first user 104 may be identified based on a combination of facial recognition (based on one or more facial images of the first user 104) and/or voice recognition (based on voice sample of the first user 104). The first electronic device 102 may then determine one or more attributes of the first user 104 based on the determined one or more physiological and/or behavioural characteristics, as explained in FIGS. 1 and 3.

In accordance with an embodiment, when the first user 104 visits the premises of the second user 108a, first electronic device 102 may transmit a notification to the second electronic device 106a indicating arrival of a new user. The notification may further request the second electronic device 106a to transmit current location information associated with the second electronic device 106a to the first electronic device 102. As shown in FIG. 5, at processing step 502, the second electronic device 106a may transmit the current location information associated with the second electronic device 106a to the first electronic device 102.

At processing step 504, the first electronic device 102 may receive the current location information associated with the second electronic device 106a from the second electronic device 106a. At processing step 506, the first electronic device 102 may select the first set of network devices 514 from the plurality of network devices 112 for transmission of custom messages/alerts. The selection of the first set of network devices 514 from the plurality of network devices 112 may be based on the current location information and/or pre-specified configuration instructions received from the second electronic device 106a. For instance, the location information of the second electronic device 106a may indicate that the second user 108a is out of station. Further, the pre-specified configuration instructions may indicate that network devices of family and friends are to be grouped together and notified about visitors to the premises 120 during the time the second user 108a is out of station. Thus, in this case, the first set of network devices 514 selected from the plurality of network devices 112 may correspond to the group of network devices associated with friends and family members of the second user 108a.

As shown in FIG. 5, at processing step 508, the first electronic device 102 may retrieve one or more media items from the plurality of media items stored at the server 110. Alternatively, the processor 202 of the first electronic device 102 may retrieve the one or more media items from the memory 204, in case the memory 204 stores the plurality of media items. The retrieval of the one or more media items may be based on the received location information and/or the one or more attributes of the first user 104. In accordance with an embodiment, the first electronic device 102 may retrieve media items for play back at different electronic devices and/or network devices.

For example, the first electronic device 102 may play back one of the retrieved media items for the first user 104, based on the one or more attributes and the current location of the second user 108a. The selection of media item from the one or more media items for play back on the first electronic device 102 for the first user 104 may be based on pre-specified configuration instructions by the second user 108a. That is, a custom message including the media item selected from the one or more retrieved media items for the first user 104 may be played back on the first electronic device 102, as illustrated in processing step 510a. Further, if the second user 108a is determined as out of station based on the location information, an appropriate media item may be retrieved from the plurality of media items based on the one or more attributes. If the one or more attributes indicate that the first user 104 is a known/trustworthy individual, the retrieved media item may indicate to the first user 104 that the second user 108a is out of station.

In addition to the media items retrieved for the first user 104, the first electronic device 102 may also retrieve media items for the second user 108a based on the location information of the second electronic device 106a. If the second user 108a is determined to be present at the premises 120 associated with the second user 108a, a selected media item may be sent to the second electronic device 106a. The reception and play back of the selected media item by the second electronic device 106a, is illustrated by processing step 510b. Alternatively, if the location information indicates that the second user 108a is present at premises of a known user, such as the first remote user 114a, a custom message associated with the known user may be retrieved based on the one or more attributes. That is, the retrieved media item may include a custom greeting for the known user and the second user 108a and also indicate the type of the first user 104 and other attributes of the first user 104. This retrieved media item may be sent to the network device (such as the first network device 112a) of the known user (such as the first remote user 114a). The reception and playback of the pre-specified media item by the first network device 112a is illustrated by processing step 510c.

The playback of the pre-specified media item on the first network device 112a may be controlled based on pre-specified configuration instructions received along with the communicated media item, from the first electronic device 102. In accordance with an embodiment, the pre-specified configuration instructions may be received from the second electronic device 106a (of second user 108a) during pre-registration of the first network device 112a and/or the second electronic device 106a. For instance, the pre-specified configuration instructions may direct the first network device 112a to playback a portion of the received media item and then playback an alert tone. Further, the first network device 112a may be directed to send the received media item to an electronic device, such as a smartphone, of the first remote user 114a if no response is received from the first remote user 114a within a predefined time interval.

In accordance with an embodiment, another media item may be retrieved for play back on the first set of network devices 514. The other media item may indicate the one or more attributes (such as type of the first user 104, purpose of visit, etc.) and also include a custom message for users of the first set of network devices 514. For instance, the custom message may include a preferred tune or greeting for each user of the first set of network devices 514. The selection of first set of network devices 514 from the plurality of network devices 112 based on the location information of the second user 108a is explained above in processing step 506. In accordance with an embodiment, the other media item may be selected from the one or more retrieved media items based on the current location information of the second user 108a and the determined one or more attributes of the first user 104. For instance, the first set of network devices 514 include network devices of friends and family who may receive custom messages and alerts when the second user 108a is out of station. Hence, when the location information of the second user 108a indicates that the second user 108a is out of town, the first electronic device 102 may send custom messages/alerts to the first set of network devices 514. The first set of network devices 514 may playback the received message and/or pre-specified media item for the second remote user 114b and the third remote user 114c, as illustrated by processing step 510c.

In addition, the first electronic device 102 may post a customized message on a social media profile of the second user 108a when the first user 104 visits the premises of the second user 108a. Further, certain play back rules may be applied to network devices of various groups of users based on characteristics or preferences of the users and/or their relationship with the second user 108a. For instance, as an aged individual may be hard of hearing, network devices belonging to the aged individuals may play back media items at a high pitch and volume.

In accordance with an embodiment, during the pre-registration, the second user 108a may provide input related to events and date-of-interest of other users including users of the plurality of network devices 112. Examples of such users may include the first remote user 114a, the second remote user 114b, and the third remote user 114c. Examples of the events may include, but not limited to, a birthday, an anniversary, an academic performance, a sports performance, or a date associated with a personal or professional accomplishment. In accordance with an embodiment, the second user 108a may provide custom greeting and tunes associated with different event types. Further, the second user 108a may provide pre-specified configuration instructions based on preferences of the concerned users for appropriate selection of the custom greetings and tunes. Thus, the greetings and the tunes may be customized by the second user 108a, by use of the second electronic device 106a, based on the event and preferences of the concerned users.

In accordance with an embodiment, certain media items may also be automatically retrieved and played back at a pre-scheduled date and time at a specific network device of the plurality of network devices 112. Based on the date-of-interest of a user, the first electronic device 102 may retrieve a custom message including a pre-selected media item (such as a customized birthday greeting tune) for the user. The first electronic device 102 may then select a network device associated with the concerned user and transmit the custom message including the pre-selected media item to that network device on the pre-scheduled data and time. For instance, as shown in FIG. 5, at processing step 512*b*, the third network device 112*c* may receive the custom message including the pre-selected media item from the first electronic device 102. The third network device 112*c* may then playback the received custom message, such as "Happy Birthday <Name: the third remote user 114*c*>", to felicitate the third remote user 114*c*. In addition to transmitting the custom message to the network device of the concerned user (such as the third remote user 114*c*), the first electronic device 102 may also transmit a reminder message to the second electronic device 106*a*. The reminder message may remind the second user 108*a* of the event related to the concerned user (that is, the third remote user 114*c*, in this case).

A person with ordinary skill in the art will understand that the exemplary scenarios 300, 400, and 500, are provided for illustrative purposes and should not be construed to limit the scope of the disclosure. The disclosure may be implemented in various other scenarios with one or more variations, without departure from the scope of the disclosure.

In accordance with an embodiment, the premises 120 may not be restricted to an official building or a residential complex associated with the second user 108*a*. In accordance with an embodiment, the disclosure may be implemented for other premises, such as an airport, a railway station, bus-stands, ship ports, and other transportation terminals. For instance, the first user 104 may correspond to a traveler and the first electronic device 102 may correspond to an electronic device installed at a ticketing counter or check-in counter of the terminal. The first electronic device 102 may automatically verify the identity of the travelers (such as the first user 104) based on a combination of facial recognition and voice recognition for auto-check in. Further, custom messages or alerts may be delivered to electronic devices of relevant authorities in case of fraud or suspicion based on detection of one or more physiological and/or behavioural characterizes of the traveler. In addition, the first electronic device 102 may be used in various other implementation scenarios. For instance, the first electronic device 102 may be used as an automated office assistant or receptionist at an office premises that may be configured to playback custom messages to interface office bearers and visitors, such as during a client visit.

Figure 6A:
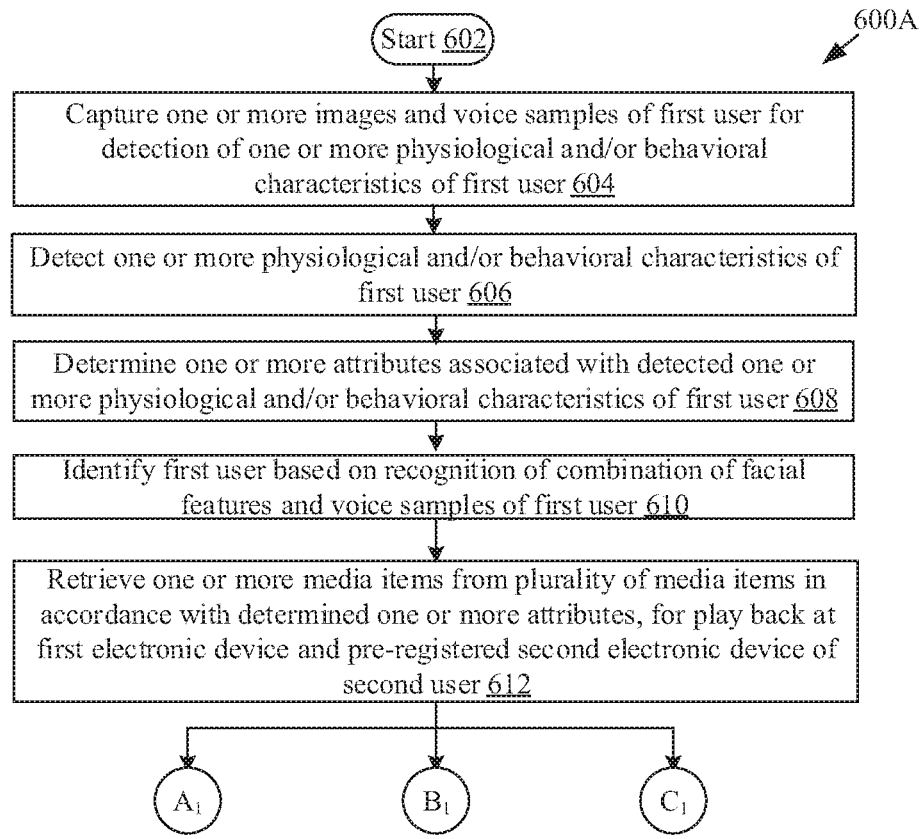
FIGS. 6A, 6B, 6C, 6D, and 6E depict flow charts that illustrate a method for customized message playback, in accordance with an embodiment of the disclosure.
Figure 6B:
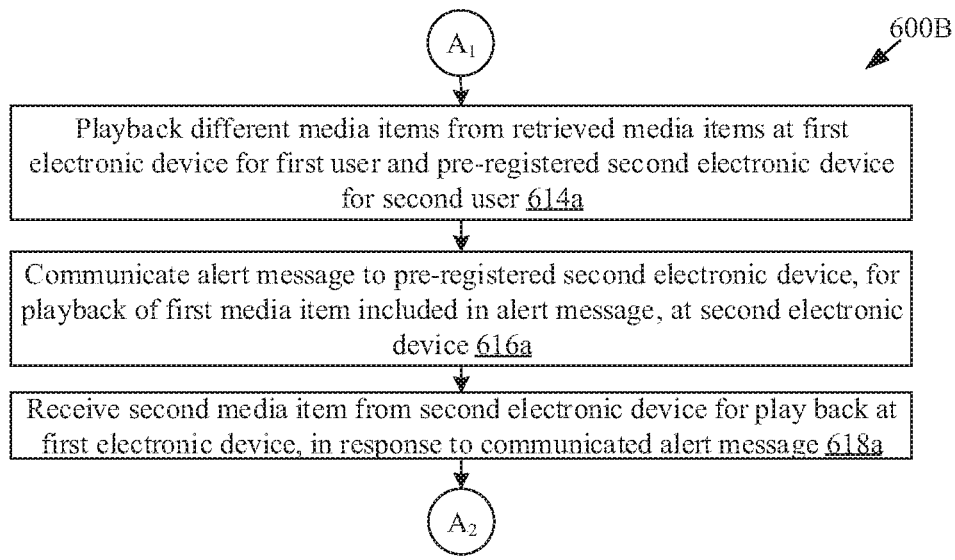
Figure 6C:
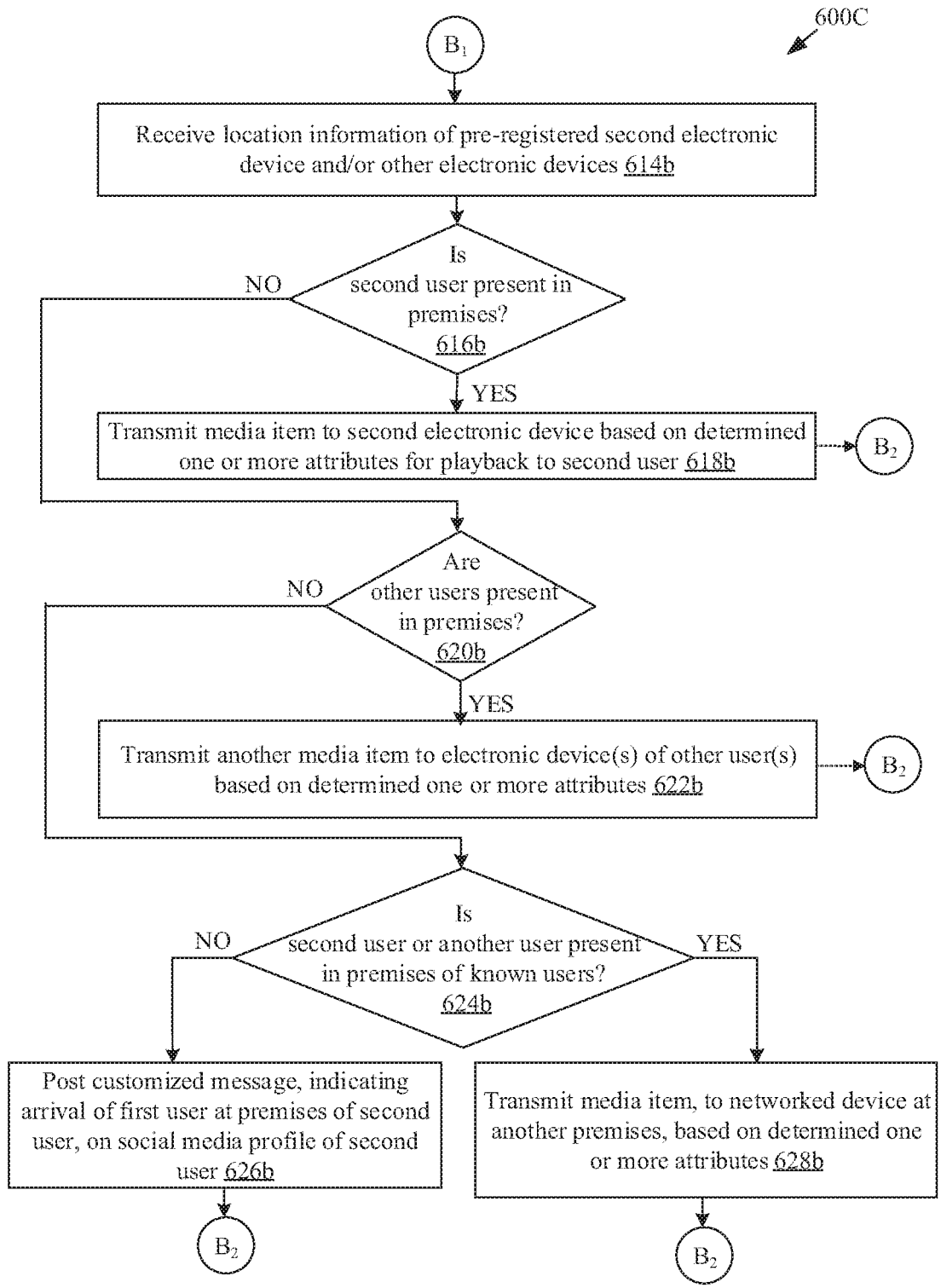
Figure 6D:
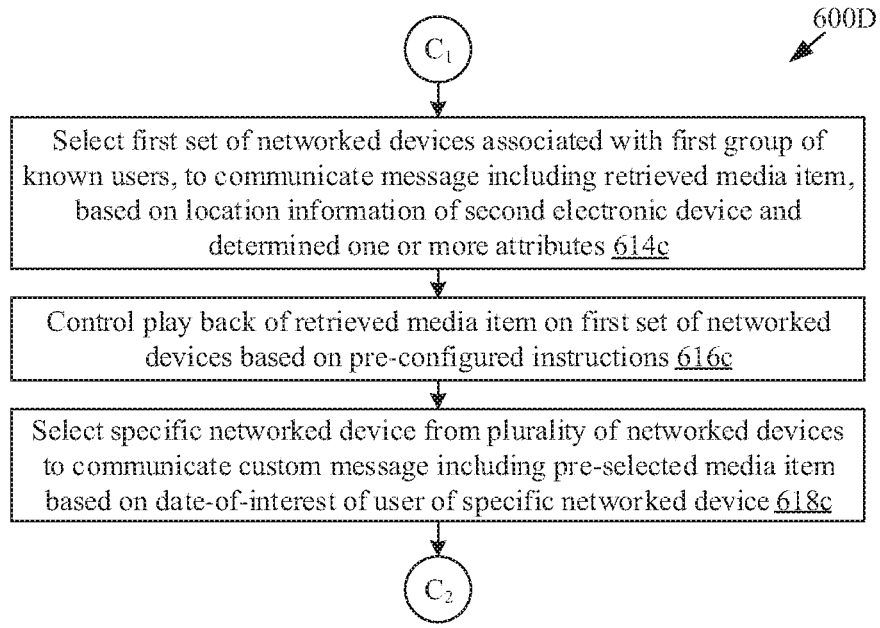
Figure 6E:
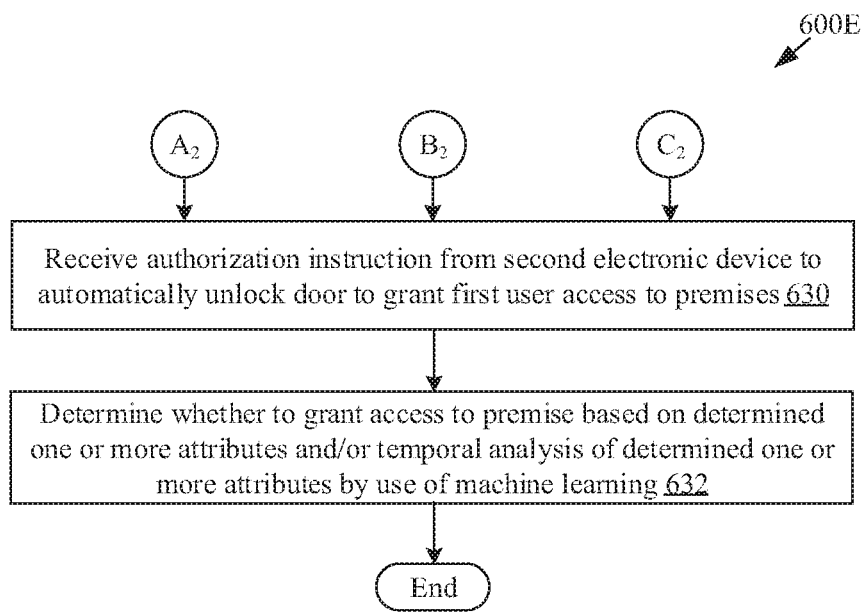

FIGS. 6A, 6B, 6C, 6D, and 6E depict flow charts that illustrate a method to playback custom messages, in accordance with an embodiment of the disclosure. The method may be implemented in the first electronic device 102. With reference to FIGS. 6A, 6B, 6C, 6D, and 6E there are shown flow charts 600A, 600B, 600C, 600D, and 600E, which are described in conjunction with FIGS. 1, 2, 3, 4, and 5. FIGS. 6B, 6C, and 6D depict flow charts that illustrate method steps which may be performed in parallel after the method steps of the flow chart of FIG. 6A. FIG. 6E depicts a flow chart that illustrates method steps that may be performed after the method steps of the flow charts of FIGS. 6B, 6C, and 6D. As shown in FIG. 6A, the method of the flow chart 600A starts at step 602 and proceeds to step 604.

At step 604, one or more images and voice samples of the first user 104 may be captured for detection of the one or more physiological and/or behavioural characteristics of the first user 104. In accordance with an embodiment, when the first user 104 arrives at the premises, the user recognition circuitry 218 may be configured to capture the one or more images (by use of the image-capturing unit 212) and the voice samples (by use of the microphone 214) of the first user 104.

Prior to the visit of the first user 104, one or more electronic devices and/or network devices may be pre-registered at the first electronic device 102 and/or the server 110. During the pre-registration of the second electronic device 106*a*, the second user 108*a* may set configuration instructions, via the pre-installed application in the second electronic device 106*a*, for selection and playback of media items on electronic devices and/or network devices. Further, the second user 108*a* may also register other electronic devices and/or network devices and group these pre-registered electronic devices and/or network devices. The second user 108*a* may also preset one or more rules related to the grouping of pre-registered network devices, such as the plurality of network devices 112.

At step 606, one or more physiological and/or behavioural characteristics of the first user 104 may be detected. The detection of the one or more attributes of the first user 104 has been explained in FIG. 1 and FIG. 3. At step 608, one or more attributes associated with the detected one or more physiological and/or behavioural characteristics of the first user 104 may be determined. The processor 202 of the first electronic device 102 may determine the one or more attributes of the first user 104 based on the detected one or more physiological and/or behavioural characteristics, as explained in FIG. 1 and FIG. 3.

At step 610, the first user 104 may be identified. In accordance with an embodiment, the user recognition circuitry 218 may be configured to transmit the one or more images and the voice samples to the server 110. The server 110 may identify the first user 104 by use of facial recognition (based on one or more facial images) and voice recognition (based on voice samples). Thus, the first user 104 may be identified based on a combination of facial recognition and voice recognition. In accordance with an embodiment, the user recognition circuitry 218 may apply one or more machine learning techniques to identify the first user 104, based on a repository of facial images and voice samples of known users.

At step 612, one or more media items may be retrieved from plurality of media items in accordance with the determined one or more attributes of the first user 104. A first pre-specified media item may be selected from the one or more retrieved media items for playback on the first electronic device 102. Further, a second pre-specified media item (different from the first pre-specified media item) may be selected for play back on the second electronic device 106*a*. The selection or play back of the first media item and the second media item may be based on pre-specified configuration instructions.

With reference to FIG. 6B, the method of the flow chart 600B may be performed in parallel to methods of the flow chart 600C of FIG. 6C and the flow chart 600D of FIG. 6D. The flow chart 600B progresses to step 614*a* from the step 612 of FIG. 6A.

At step 614*a*, different media items from the retrieved media items may be played back at the first electronic device 102 and the pre-registered second electronic device 106a. In accordance with an embodiment, the first media item may be played back at the first electronic device 102. The first media item may be custom message for the first user 104, such as "Welcome Peter <the first user 104>". Further, the second media item may be played back at the second electronic device 106a. The second media item may include custom message, greetings, and tunes that may be preferred by the second user 108a and may be based on determined one or more attributes of the first user 104. For example, a custom audio, such as "Hi John <the second user 108a>, Peter <the first user 104> is standing outside the door of your home <the premises 120>", may be played at the second electronic device 106a.

At step 616a, an alert message may be communicated to the pre-registered second electronic device 106a by the first electronic device 102. The alert message may include the first media item for play back on the second electronic device 106a for the second user 108a. For instance, the first user 104 may record a voice mail message or an A/V message as an alert message for the second user 108a. Alternatively, the alert message may be automatically generated by the first electronic device 102 based on the type of the first user 104 and/or other determined attributes of the first user 104.

At step 618a, a second media item may be received from the second electronic device 106a for playback on the first electronic device 102, in response to the communicated alert message. In accordance with an embodiment, the first electronic device 102 may receive the second media item from the second electronic device 106a. The second media item may correspond to a response message by the second user 108a to the first user 104. The response message in the second media item may be in the form of an audio recording, a text message, and/or A/V content. An exemplary scenario of playback of media items on the first electronic device 102 and the second electronic device 106a is explained in FIG. 3.

With reference to FIG. 6C, the method of the flow chart 600C may be performed in parallel to methods of the flow chart 600B of FIG. 6B and the flow chart 600D of FIG. 6D. The flow chart 600C progresses to step 614b from the step 612 (FIG. 6A). At step 614b, location information of the pre-registered second electronic device 106a and/or other pre-registered electronic devices may be received. In accordance with an embodiment, the first electronic device 102 may receive the location information of the second electronic device 106a and/or the other pre-registered electronic devices from the respective electronic devices and/or the server 110. Examples of the other pre-registered electronic devices may include, but not limited to, the third electronic device 106b and the fourth electronic device 106c.

At step 616b, a first check may be performed to determine whether the second user 108a is present at the premises 120. In accordance with an embodiment, the first electronic device 102 may check the current location information received from the second electronic device 106a to determine whether the location of the second user 108a coincides with that of the premises 120. In case the second user 108a is determined to be present within the premises 120, step 618b may be performed, otherwise, step 620b may be performed.

At step 618b, a media item from the retrieved one or more media items may be transmitted to the second electronic device 106a, based on the current location of the second user 108a. In accordance with an embodiment, the first electronic device 102 may retrieve the media item from plurality of media items based on the determined one or more attributes of the first user 104. The first electronic device 102 may transmit the retrieved media item to the second electronic device 106a, present at the premises 120. The playback of the media item at the second electronic device 106a for the second user 108a may be controlled based on the pre-specified configuration instructions. In accordance with an embodiment, the control may pass to step 630 (FIG. 6E) from the step 618b.

At step 620b, a second check may be performed to determine whether one or more other users (such as the third user 108b or the fourth user 108c) are present at the premises 120. In accordance with an embodiment, the first electronic device 102 may check the current location information received from the one or more other pre-registered electronic devices, such as the third electronic device 106b and the fourth electronic device 106c. Based on this received current location information, the first electronic device 102 may determine whether the location of one or more of the other users coincides with that of the premises 120. In case one or more of the other users (such as the third user 108b or the fourth user 108c) are determined to be present in the premises 120, step 622b may be performed, otherwise, step 624b may be performed.

At step 622b, another media item may be transmitted to the other pre-registered electronic devices, based on the current location information of the one or more other users. In accordance with an embodiment, the first electronic device 102 may retrieve the other media item from plurality of media items based on the determined one or more attributes of the first user 104. The first electronic device 102 may transmit the retrieved other media item to a specific electronic device of a user, present at the premises 120. For instance, if the third user 108b is present at the premises 120, the retrieved other media item may be transmitted to the third electronic device 106b. The playback of the other media item at the third electronic device 106b) of the third user 108b present within the premises 120, may be controlled based on the pre-specified configuration instructions. In accordance with an embodiment, the control may pass to step 630 (FIG. 6E) from the step 622b.

At step 624b, a third check may be performed to determine whether the second user 108a and/or the one or more other users (such as the third user 108b or the fourth user 108c) are present at premises of other known users. Based on the received current location information, the first electronic device 102 may determine whether the location of the second user 108a and/or one or more of the other users (such as, the third user 108b or the fourth user 108c) coincides with that of a location of a network device associated with premises of other known user. In case the second user 108a and/or another user (such as the third user 108b or the fourth user 108c) are determined to be present at premises of a known user, step 626b may be performed, otherwise, step 628b may be performed.

At step 626b, a customized message may be posted on a social media profile of the second user 108a. In accordance with an embodiment, the first electronic device 102 may generate the customized message for the second user 108a based on pre-specified configuration instructions. Thereafter, the first electronic device 102 may post the generated customized message on the social media profile of the second user 108a. The customized message may indicate an arrival of the first user 104 at the premises 120 of the second user 108a. Based on the posted customized message, the second user 108a and one or more connections (such as friends, family members, and other acquaintances) of the second user 108a may be notified of the visit of the first user 104 at the premises 120.

At step 628b, one or more other media items may be retrieved from the plurality of media items based on the received location information and/or the determined one or more attributes. In accordance with an embodiment, the first electronic device 102 may retrieve the one or more other media items from the plurality of media items based on the location information and the determined one or more attributes. The location information may indicate presence or absence of the second user 108a and/or other users (such as the third user 108b or the fourth user 108c) at a preset location of premises of a known user. For instance, if the location information of the second electronic device 106a indicates that the second user 108a is currently visiting a premise of a known user, such as the first remote user 114a, the retrieved media items may be specific to the first remote user 114a and the second user 108a. The retrieved media items may include custom message (including indication of the attributes of the first user 104), greetings, and tunes preferred by the first remote user 114a. Further, the first electronic device 102 may transmit the specific retrieved media item to a network device associated with the first remote user 114a, such as the first network device 112a, for play back. An exemplary scenario of the playback of pre-specified media items on a specific electronic device or networked device is explained in FIG. 5.

With reference to FIG. 6D, the method of the flow chart 600D may be performed in parallel to method of the flow chart 600B of FIG. 6B and 600C of FIG. 6C. The flow chart 600D progresses to step 614c from the step 612 of FIG. 6A.

At step 614c, a first set of network devices associated with a first group of known users may be selected. In accordance with an embodiment, the first electronic device 102 may select the first set of network devices (such as the set of network devices 514 of FIG. 5) from the plurality of network devices 112. The selection of the first set of network devices 514 may be based on pre-specified configuration instructions. For example, the first set of network devices 514 may include network devices of a group of individuals including family members and friends of the second user 108a.

In accordance with an embodiment, the first electronic device 102 may communicate messages to the first set of network devices 514 based on location information of the second electronic device 106a and the determined one or more attributes. For instance, if the location information indicates that the second user 108a is out of station, network devices of family members and friends may be selected as the first set of network devices 514. The first electronic device 102 may then send customized messages including retrieved media items to the first set of network devices 514 based on the determined one or more attributes of the first user 104. For instance, if the first user 104 is a technician, a particular media item associated with the technician profession may be retrieved and sent to the first set of network devices 514 to inform appropriate friends or family members to attend to the first user 104.

At step 616c, play back of the retrieved media item on the first set of network devices 514 may be controlled based on pre-specified configuration instructions. In accordance with an embodiment, the first electronic device 102 may control the playback of the retrieved media item on the first set of network devices 514. The first electronic device 102 may send the pre-specified configuration instructions (received from the second electronic device 106a during the pre-registration) to the first set of network devices 514, along with the retrieved media item. The received media item may be played back on the first set of network devices 514 in accordance with the pre-specified configuration instructions. For instance, a portion of the received media item may be played back iteratively for a given number of iterations followed by an alert tune. Thereafter, if no response is received from a given network device, such network device may be directed to send the received media item to an electronic device of an associated user, such as the first remote user 114a, for play back. The pre-specified media item may then be played back on the electronic device associated with the user of the network device. An exemplary scenario for the playback of pre-specified media item on the first set of network devices 514 has been explained in FIG. 5.

At step 618c, a specific network device from the plurality of network devices 112 may be selected for communication of a custom message. In accordance with an embodiment, the first electronic device 102 may select the specific network device (such as the first network device 112a) from the plurality of network devices 112 for communication of the custom message based on pre-specified configuration instructions. The pre-specified configuration instructions may include details of events and a date-of-interest of users known to the second user 108a. Examples of the events and/or date-of-interest may include, but not limited to, a birthday, an anniversary, an academic performance, a sports performance, and/or a professional or personal accomplishment. An exemplary scenario of transmission of custom message to a specific network device of a known user based on occurrence of an event and/or a date-of-interest of that known user has been explained in FIG. 5. A person skilled in the art may understand that step 618c may be performed before step 616c of the method of flow chart 600D (of FIG. 6D) without departure from the scope of the disclosure.

With reference to FIG. 6E, the methods of the flow charts 600B (of FIG. 6B), 600C (of FIG. 6C), and 600D (of FIG. 6D) may merge at step 630, as shown. The flow chart 600E progresses to step 630. At step 630, an authorization instruction may be received from the second electronic device 106a. In accordance with an embodiment, the first electronic device 102 may receive the authorization instruction from the second electronic device 106a. The authorization instruction may permit an automatic unlocking of a door of the premises 120 of the second user 108a to grant the first user 104 access to the premises 120. The second user 108a may provide the authorization instruction through the second electronic device 106a, based on the presented facial image, voice message, and/or identification information. An exemplary scenario that depicts grant of access to the premises 120 by the first electronic device 102, has been explained in FIG. 3.

At step 632, it may be determined whether to grant the first user 104 an access to the premises 120. In accordance with an embodiment, the first electronic device 102 may determine whether to grant the first user 104 access to the premises 120 of the second user 108a. The determination may occur based on the determined one or more attributes and/or temporal analysis of the determined one or more attributes by use of the machine learning. An exemplary scenario of the automatic grant of access to the premises 120 of the second user 108a by the first electronic device 102 has been explained in FIG. 3. A person skilled in the art may understand that the step 632 may be performed before step 630. In such a case, a result of the decision to grant the access to the first user 104 may be communicated by the first electronic device 102 to the second electronic device 106a.

The second electronic device 106a may prompt the second user 108a to confirm and provide access to the first user 104. If the second user 108a confirms the access, the authorization instruction may be transmitted (as explained in step 630) and the door of the premises 120 may be automatically opened. Otherwise, the first user 104 may have to provide further details for authentication, or the second user 108a may transmit custom messages through the second electronic device 106a to the first electronic device 102. The custom messages may be played back to the first user 104 by the first electronic device 102, and a response (such as a voice message or an A/V response) may be received from the first user 104 by the first electronic device 102. The first electronic device 102 may communicate this response to the second electronic device 106a and the second user 108a may decide whether to authorize the first use 104 based on the response. The control passes to end step.

Figure 7:
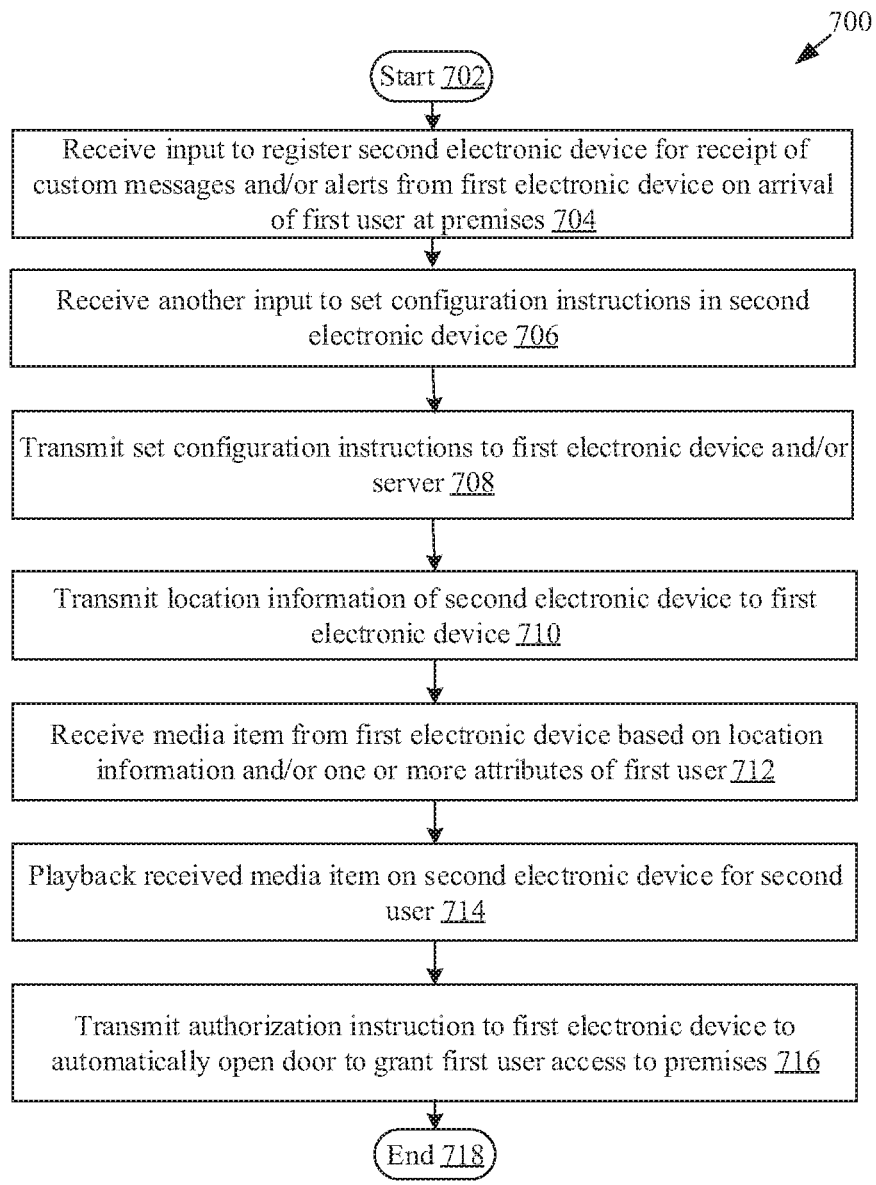
FIG. 7 depicts a flow chart that illustrates another method for customized message playback, in accordance with an embodiment of the disclosure.

FIG. 7 depicts a flow chart that illustrates another method for play back of customized messages, in accordance with an embodiment of the disclosure. With reference to FIG. 7, there is shown a flow chart 700, which is described herein in conjunction to elements from FIGS. 1, 2, 3, 4, and 5. The method of flow chart 700 may be implemented in the second electronic device 106a. The flow chart 700 starts at step 702 and progress to step 704.

At step 704, an input may be received to register the second electronic device 106a for receipt of custom messages/alerts from the first electronic device 102 on arrival of the first user 104 at the premises 120. In accordance with an embodiment, the second electronic device 106a may provide the input, via a user interface of the second electronic device 106a. The user interface may correspond to the application pre-installed in the second electronic device 106a.

The registration of the second electronic device 106a may enable the second electronic device 106a to receive custom messages and/or alerts when a visitor (such as the first user 104) arrives at the premises 120. During or after the registration of the second electronic device 106a, the second user 108a may provide an input to register other electronic devices, such as electronic devices of other residents of the premises 120. Examples of such other electronic devices may include the third electronic device 106b of the third user 108b and the fourth electronic device 106c of the fourth user 108c. Further, the second user 108a may register one or more networked devices from the plurality of network devices 112. During or after the registration, the second user 108a may provide configuration input, as described next.

At step 706, another input may be received to set configuration instructions in the second electronic device 106a. The configuration instructions may be set via the user interface of the second electronic device 106a. The configuration instructions may include instructions for selection of one or more media items from a plurality of media items for playback on a pre-registered electronic device and/or a pre-registered networked device, upon arrival of the first user 104. The configuration instructions may further include instructions for grouping of network devices from the plurality of network devices 112 into one or more logical groups for playback of custom messages, as illustrated and explained in FIG. 5.

At step 708, the set configuration instructions may be transmitted to the first electronic device 102 and/or the server 110. The first electronic device 102 may store the received configuration instructions as pre-specified configuration instructions in the memory 204. The pre-specified configuration instructions may control the retrieval of the one or more media items from the plurality of media items by the first electronic device 102. Further, the pre-specified configuration instructions may control playback of pre-specified media items from the retrieved one or more media items on the first electronic device 102, one or more pre-registered electronic devices, and/or one or more pre-registered network devices. In addition, the pre-specified configuration instructions may be used to select a set of network devices (or a single networked device) for transmission of custom messages by the first electronic device 102.

At step 710, location information of the second electronic device 106a may be transmitted to the first electronic device 102. In accordance with an embodiment, the second electronic device 106a may include a GPS module installed in it, which may be used to determine location co-ordinates associated with the second electronic device 106a.

At step 712, a media item may be received from the first electronic device 102. In accordance with an embodiment, the first electronic device 102 may retrieve one or more media items from the plurality of media items based on the one or more attributes of the first user 104. The first electronic device 102 may communicate the media item, from the one or more retrieved media items, for play back on the second electronic device 106a, based on the location information and pre-specified configuration instructions.

At step 714, the received media item may be played back on the second electronic device 106a. In accordance with an embodiment, the second electronic device 106a may play back the received media item for the second user 108a. In accordance with an embodiment, the playback of the media item on the second electronic device 106a may be controlled based on instructions received from the first electronic device 102.

At step 716, an authorization instruction may be transmitted to the first electronic device 102. The second electronic device 106a may display a prompt on a display of the second electronic device 106a to seek a permission from the second user 108a to grant an access to the first user 104 to the premises 120. Based on a user-input received from the second user 108a in response to the prompt, the second electronic device 106a may generate an authorization instruction, if the second user 108a agrees to grant the permission. The second electronic device 106a may transmit the authorization instruction to the first electronic device 102, which in response to the receipt of the instruction may automatically open a door associated with an entrance of the premises 120. Thus, the first user 104 may be granted an access to the premises 120, based on the receipt of authorization instruction at the first electronic device 102. Control passes to end step 718.

In accordance with an exemplary aspect of the disclosure, a system for customized message playback is disclosed. The system (such as the first electronic device 102 (FIG. 1)) may comprise one or more circuits (hereinafter referred to as the processor 202 (FIG. 2)). The processor 202 may be configured to detect one or more physiological and/or behavioural characteristics of the first user 104 (FIG. 1). Thereafter, the processor 202 may be configured to determine one or more attributes associated with the detected one or more physiological and/or behavioural characteristics of the first user 104. Further, the processor 202 may retrieve one or more media items from a plurality of media items in accordance with the determined one or more attributes. The retrieved one or more media items may be played back at the first electronic device 102 for the first user 104 and/or the pre-registered second electronic device 106a (FIG. 1) for the second user 108a (FIG. 1).

Various embodiments of the disclosure may provide a non-transitory computer readable medium and/or storage medium having stored thereon, a set of instructions executable by a machine and/or a computer for customized message playback. The set of instructions may cause the machine and/or computer (such as the first electronic device 102 (FIG. 1)) to perform the steps that comprise detection of one or more physiological and/or behavioural characteristics of the first user 104 (FIG. 1). Thereafter, one or more attributes associated with the detected one or more physiological and/or behavioural characteristics of the first user 104 may be determined. Further, one or more media items may be retrieved from a plurality of media items in accordance with the determined one or more attributes. The retrieved one or more media items may be played back at the first electronic device 102 for the first user 104 and/or the pre-registered second electronic device 106*a* (FIG. 1) for the second user 108*a* (FIG. 1).

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. A system for customized message playback, the system comprising:
a first electronic device that comprises circuitry configured to:
detect a physiological characteristic of a first user that identifies the first user;
determine at least one attribute associated with the detected physiological characteristic of the first user;
retrieve a first media item from a plurality of media items based on the determined at least one attribute;
play back the first media item at the first electronic device; and
communicate an alert message to a registered second electronic device associated with a second user, wherein
the alert message includes information associated with the first user, and
the alert message includes a second media item for playback at the registered second electronic device.

2. The system according to claim 1, wherein the first electronic device corresponds to at least one of a smart door bell, a security device, a smart door, an electronic security lock, or a surveillance system.

3. The system according to claim 1, wherein the detected physiological characteristic of the first user corresponds to at least one of facial features, a voice sample, a clothing pattern, an emotional state, a current activity of the first user, or an object that is one of wearable or held by the first user.

4. The system according to claim 1, wherein
the at least one attribute of the first user comprises at least one of an identity of the first user, a type of relationship between the first user and the second user, a profession of the first user, an event associated with the first user, a date-of-interest associated with the first user, a visit history of the first user, a scheduled visit of the first user to premises of the second user, or a purpose of visit associated with previous visits of the first user to the premises, and
the first user is a visitor of the premises and the second user is an occupant of the premises.

5. The system according to claim 1, wherein
the circuitry is further configured to capture at least one of an image of the first user or a video of the first user, and
the detection of the physiological characteristic of the first user is based on the capture of the at least one of the image of the first user or the video of the first user.

6. The system according to claim 1, wherein the circuitry is further configured to recognize the first user based on the detected physiological characteristic of the first user.

7. The system according to claim 1, wherein the circuitry is further configured to recognize the first user based on recognition of a combination of facial features of the first user and a voice sample of the first user.

8. The system according to claim 1, wherein the circuitry is further configured to:
receive a third media item of the plurality of media items from the registered second electronic device, based on the communication of the alert message to the registered second electronic device, and
play back the received third media item at the first electronic device.

9. The system according to claim 1, wherein
the circuitry is further configured to receive, via a communication network, current location information of at least one of the registered second electronic device associated with the second user or a registered third electronic device associated with a third user, and
the current location information is received from at least one of the registered second electronic device, the registered third electronic device, or a cloud server.

10. The system according to claim 9, wherein
the first media item is retrieved based on the received current location information, and
the received current location information indicates one of a presence or an absence of at least one of the registered second electronic device or the registered third electronic device, at a location of premises.

11. The system according to claim 9, wherein
the circuitry is further configured to retrieve a fourth media item from the plurality of media items, based on the determined at least one attribute associated with the first user and the received current location information, and
the received current location information indicates the registered second electronic device is present at one of a plurality of locations associated with known users.

12. The system according to claim 11, wherein
the circuitry is further configured to control play back of the retrieved fourth media item on a specific network device, and
the specific network device is associated with the one of the plurality of locations.

13. The system according to claim 9, wherein the circuitry is further configured to:
select a first set of network devices from a plurality of network devices, wherein the plurality of network devices are installed at different locations; and
communicate a message that includes a fifth media item of the plurality of media items, based on the selection of the first set of network devices, the determined at least one attribute, and the received current location information of the registered second electronic device, wherein the first set of network devices are associated with a group of known users.

14. The system according to claim 13, wherein
the circuitry is further configured to control play back of the fifth media item on the first set of network devices based on instructions, and
the instructions are one of stored at the first electronic device, received from the registered second electronic device, or retrieved from the cloud server.

15. The system according to claim 13, wherein the circuitry is further configured to:
select a specific network device from the plurality of network devices; and
communicate a customized message that includes a sixth media item of the plurality of media items, wherein the communication of the customized message is based on a date-of-interest associated with a fourth user of the selected specific network device.

16. The system according to claim 1, wherein the circuitry is further configured to receive an authorization instruction from the registered second electronic device to automatically unlock a door to grant an access to premises of the second user.

17. The system according to claim 1, wherein
the circuitry is further configured to determine whether to grant an access to premises of the second user based on at least one of the determined at least one attribute or a result of a temporal analysis of the determined at least one attribute, and
the temporal analysis is based on a machine learning technique.

18. A method for customized message playback, the method comprising:
detecting, by a first electronic device, a physiological characteristic of a first user that identifies the first user;
determining, by the first electronic device, at least one attribute associated with the detected physiological characteristic of the first user;
retrieving, by the first electronic device, a first media item from a plurality of media items based on the determined at least one attribute;
playing back the first media item at the first electronic device; and
communicating an alert message to a registered second electronic device associated with a second user, wherein
the alert message includes information associated with the first user, and
the alert message includes a second media item for playback at the registered second electronic device.

19. The method according to claim 18, wherein
the at least one attribute of the first user comprises at least one of an identity of the first user, a type of relationship between the first user and the second user, a profession of the first user, an event associated with the first user, a date-of-interest associated with the first user, a visit history of the first user, a scheduled visit of the first user to premises of the second user, or a purpose of visit associated with previous visits of the first user to the premises, and
the first user is a visitor of the premises and the second user is an occupant of the premises.

* * * * *